US012059737B2

(12) United States Patent
Lu et al.

(10) Patent No.: US 12,059,737 B2
(45) Date of Patent: Aug. 13, 2024

(54) POWER TOOL AND METHOD FOR STARTING THE SAME

(71) Applicant: Nanjing Chervon Industry Co., Ltd., Nanjing (CN)

(72) Inventors: Bing Lu, Nanjing (CN); Xin Yang, Nanjing (CN); Yuwei Yang, Nanjing (CN); Yi Zhou, Nanjing (CN); Tianxiao Xu, Nanjing (CN); Junya Duan, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 732 days.

(21) Appl. No.: 17/193,563

(22) Filed: Mar. 5, 2021

(65) Prior Publication Data
US 2021/0187635 A1  Jun. 24, 2021

Related U.S. Application Data

(63) Continuation of application No. PCT/CN2019/106454, filed on Sep. 18, 2019.

(30) Foreign Application Priority Data

Sep. 18, 2018 (CN) .......................... 201811085427.0
Jan. 10, 2019 (CN) .......................... 201910021260.X

(51) Int. Cl.
*B23D 45/16* (2006.01)
*B25F 5/02* (2006.01)
(Continued)

(52) U.S. Cl.
CPC ................ *B23D 45/16* (2013.01); *B25F 5/02* (2013.01); *H02P 1/16* (2013.01); *H02P 6/21* (2016.02)

(58) Field of Classification Search
CPC ... B25B 21/00; B25F 5/00; B25F 5/02; H02P 1/42; H02P 1/26; H02P 1/16; H02P 1/24; H02P 6/21; H02P 29/68; B23D 45/16
(Continued)

(56) References Cited

U.S. PATENT DOCUMENTS

2008/0042607 A1* 2/2008 Miyazaki .................. H02P 3/08
                                                        318/504
2014/0108114 A1   4/2014 Mokm et al.
2015/0196987 A1* 7/2015 Hayashi .................. B25F 5/021
                                                        173/46

FOREIGN PATENT DOCUMENTS

CN           103312237 A      9/2013
CN           106103004 A     11/2016
(Continued)

OTHER PUBLICATIONS

ISA/CN, International Search Report issued on PCT application No. PCT/CN2019/106454, dated Dec. 23, 2019, 3 pages.
(Continued)

*Primary Examiner* — Nhat Chieu Q Do
(74) *Attorney, Agent, or Firm* — Greenberg Traurig, LLP

(57) ABSTRACT

A power tool includes a tool accessory, a motor, a control module, a power supply, and an operating switch. The operating switch includes a trigger mechanism, a current switch coupled to the trigger mechanism to be actuated by the trigger mechanism for connecting and disconnecting the electrical connection between the power supply module and the motor, and a signal switch coupled to the trigger mechanism to be actuated by the trigger mechanism at least configured to output a control signal to the control module to control the start of the motor.

15 Claims, 27 Drawing Sheets

(51) Int. Cl.
*H02P 1/16* (2006.01)
*H02P 6/21* (2016.01)

(58) Field of Classification Search
USPC .......................................................... 83/523
See application file for complete search history.

(56) References Cited

FOREIGN PATENT DOCUMENTS

| | | | |
|---|---|---|---|
| CN | 106253765 | A | 12/2016 |
| CN | 205901644 | U | 1/2017 |
| CN | 106559025 | A | 4/2017 |
| CN | 206425618 | U | 8/2017 |
| CN | 107516605 | A | 12/2017 |
| EP | 1873801 | A1 | 1/2008 |
| EP | 2896486 | A1 | 7/2015 |
| WO | 2012/043288 | A1 | 4/2012 |
| WO | 2014108110 | A1 | 7/2014 |

OTHER PUBLICATIONS

EPO, extended European search report issued on European patent publication No. 3840211, dated Oct. 20, 2021, 7 pages.

\* cited by examiner

POWER TOOL AND METHOD FOR STARTING THE SAME

RELATED APPLICATION INFORMATION

The present application claims the benefit of Chinese Patent Application No. 201811085427.0, filed on Sep. 18, 2018, and Chinese Patent Application No. 201910021260.X, filed on Jan. 10, 2019, in the CNIPA (China National Intellectual Property Administration), each of which is incorporated herein by reference in its entirety.

BACKGROUND

Power tools such as angle grinders and circular saws have a relatively large working current. The relatively large working current is generally carried by a high-current switch provided in a main circuit. The contacts of the high-current switch are prone to sparks, which may lead to deformation or failure of the contacts, bringing safety hazards. Therefore, there is an urgent need for a solution that prevents the failure of switch control when carrying a large current and improves the accuracy of switch control in power tools, and further improves power tool safety.

SUMMARY

The present application provides a power tool enabled to carry large currents and the switch control is not easy to fail.

This application adopts the following technical solutions:

A power tool including: a tool accessory; a motor for driving the tool accessory; a control module for controlling the operation process of the motor; a power supply module for providing electric power for the motor and the control module; an operating switch includes: a trigger mechanism; a current switch for connecting and disconnecting the electrical connection between the power supply module and the motor; the current switch is coupled to the trigger mechanism to be actuated by the trigger mechanism; a signal switch at least configured to output a control signal to the control module to control the start of the motor; the signal switch is coupled to the trigger mechanism to be actuated by the trigger mechanism.

A method for starting the power tool, the power tool further including: a drive circuit electrically connected to the motor and the power supply module; a power storage element operably connected with the drive circuit in parallel; the method for starting the power tool includes: turning on the current switch; after the current switch is turned on, charging the power storage element after delaying a predetermined time period.

A method for starting the power tool, the power tool further including: a drive circuit electrically connected to the motor and the power supply module; a power storage element operably connected with the drive circuit in parallel; the method for starting the power tool includes: turning on the current switch; after the current switch is turned on, charging or discharging the power storage element with a first current and then a second current; the value of the first current is less than the value of the second current.

DETAILED DESCRIPTION

The application will be specifically introduced below in conjunction with the drawings and examples.

In this application, power tools can be hand-held power tools, gardening tools and so on. The power tools of this application may include the following: speed adjusting power tools such as screwdrivers, electric drills, wrenches, angle grinders, etc.; polishing power tools such as sanders, etc.; cutting power tools such as reciprocating saws, circular saws, jig saws, etc.; impacting power tools such as electric hammers, etc. The power tools may also be gardening tools, such as hedge trimmers and chain saws; in addition, these tools may also be used for other purposes, such as mixers. As long as these power tools adopt the substance of the technical solutions disclosed below, they fall within the protection scope of this application.

A power tool includes: a tool accessory for realizing the function of the power tool; a motor for driving the tool accessory; a control module for controlling the operation process of the motor; a power supply module for providing electric power for the motor and the control module; an operating switch operable to control the power tool; wherein the operating switch includes: a trigger mechanism to be operably actuated; a current switch for connecting and disconnecting the electrical connection between the power supply module and the motor; the current switch is coupled to the trigger mechanism to be actuated by the trigger mechanism; a signal switch at least configured to output a control signal to the control module to control the start of the motor; the signal switch is coupled to the trigger mechanism to be actuated by the trigger mechanism.

The following illustrates the implementation of the present application with two typical power tools as examples.

Figure 1:
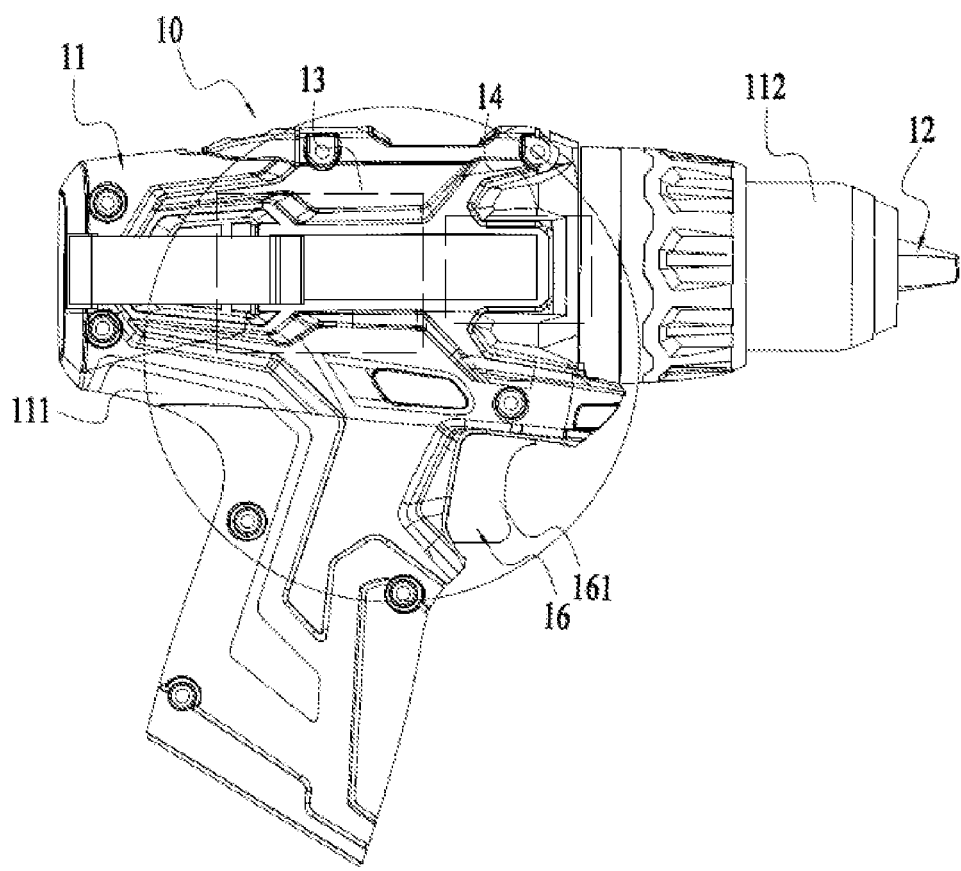
FIG. 1 is an external view of a power tool according to an example.
Figure 2:
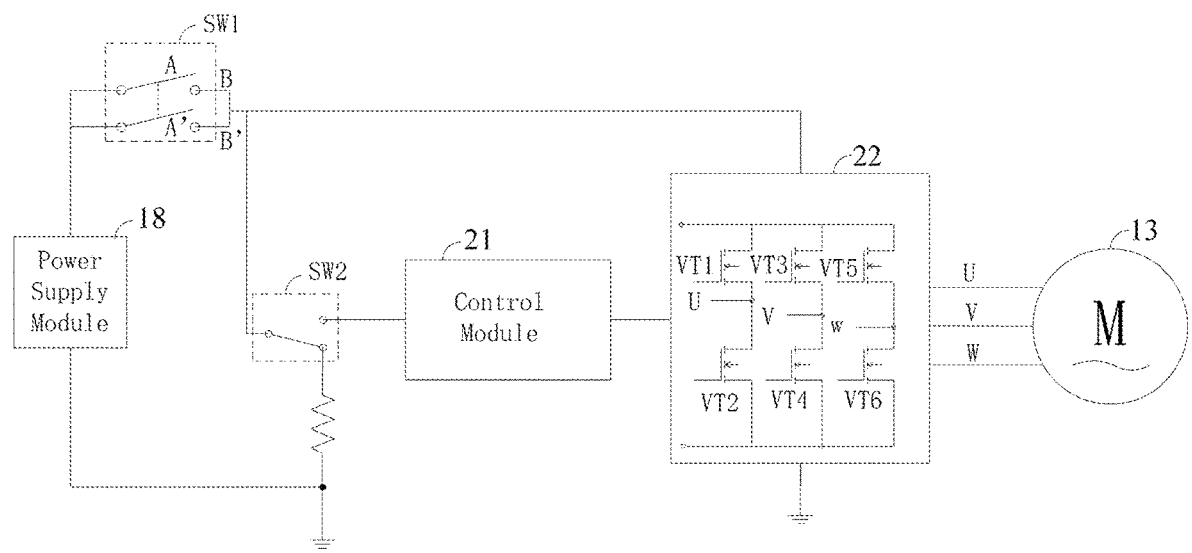
FIG. 2 is a schematic diagram of an example of a circuitry of the power tool shown in FIG. 1.

Referring to FIGS. 1 and 2, in an example, a power tool 10 takes a drill as an example, the structure of the drill shown in FIG. 1 includes: a housing 11, a tool accessory 12, a motor 13, and an operating switch 16. Wherein the housing 11 is configured to accommodate the motor 13, the circuit board, etc.; one end of the housing 11 is also configured to mount the tool accessory 12. In the front-back direction, the housing 11 further includes a body housing portion 111 and a head housing portion 112, wherein the body housing portion 111 can accommodate the motor 13 and a circuit board, and the head housing portion 112 can connect the tool accessory 12. Taking the head housing portion as the front, in the left-right direction, the body housing portion 111 can be symmetrically arranged with respect to the section plane of the structure shown in FIG. 1. On two sides of the section plane, the body housing portion 111 may include mutually symmetrical left housing portion and right housing portion.

The housing 11 is formed with a handle, and the operating switch 16 is provided on the handle for the user to operate. The operating switch 16 is actuated by user operation to control the operation process of the power tool 10. The tool accessory 12 is configured to realize the function of the power tool 10. For an electric drill, the tool accessory 12 may be a drill bit.

As an alternative, the power tool further includes a transmission device 14. The transmission device 14 is configured to transmit the power output by the motor 13 to the tool accessory 12, thereby driving the tool accessory 12 to output power.

Referring to FIG. 2, to control the operation of the motor 13, the power tool 10 further includes: a power supply module 18, a control module 21, a current switch SW1 and a switch signal SW2.

The power supply module 18 is used to provide electric power for the power tool 10, and the power supply module includes a DC power supply or an AC power supply. In some examples, the power supply module 18 includes a DC power supply, and in some examples, the power supply module 18 includes a battery pack. In other examples, the power supply module 18 includes an AC power supply, and the power tool 10 uses AC power supply. The AC power supply can be 120V or 220V AC mains. The power supply module includes an AC-DC power conversion circuit, which is connected to the AC power supply and converts the alternating current into electric power for the power tool 10.

Optionally, the power tool further includes a drive circuit 22, and the control module 21 is electrically connected to the drive circuit 22 for outputting drive signals for controlling operation of the drive circuit 22. In some examples, the control module 21 uses a dedicated control chip, for example, a single chip microcomputer (MCU, Microcontroller Unit).

The drive circuit 22 is configured to drive the motor 13 to output power and is electrically connected to the motor 13. The drive circuit 22 is also electrically connected with the control module 21 to receive drive signals from the control module 21. The drive circuit 22 is electrically connected to the three-phase electrodes U, V, and W of the motor 13 to drive the motor 13 to operate. The drive circuit 22 shown in FIG. 2 includes a plurality of drive switches VT1, VT2, VT3, VT4, VT5, and VT6; the plurality of drive switches VT1, VT2, VT3, VT4, VT5, and VT6 compose a three-phase bridge. The drive switch can be a MOSFET or an IGBT. The plurality of drive switches VT1-VT6 change the connection state according to the drive signals output by the control module 21, thereby changing the voltage state of the battery pack loaded on the windings of the motor 13 and generating an alternating magnetic field to drive the rotor to rotate, thereby realizing the drive of the motor 13, driving the motor 13 to run.

The operating switch 16 includes a trigger mechanism 161; the trigger mechanism 161 can be operated by a user. The trigger mechanism 161 may be, for example, a trigger. The operating switch 16 further includes a current switch SW1 and a signal switch SW2. The current switch SW1 and the signal switch SW2 are coupled to the trigger mechanism 161 to be actuated by the trigger mechanism 161.

The current switch SW1 is configured to switch on or off the electrical connection between the power tool 10 and the power supply module 18. In some examples, one end of the current switch SW1 is electrically connected to the power supply module 18, and the other end is electrically connected to the drive circuit 22. The drive circuit 22 can be electrically connected or disconnected from the power supply module 18 through the current switch SW1. The current switch SW1 is actuated by the trigger mechanism 161 to switch between the on state and the off state. When the current switch SW1 is in the on state, the power tool 10 is electrically connected to the power supply module 18, and the power supply module 18 supplies power to the power tool 10. When the current switch SW1 is in the off state, the electrical connection between the power tool 10 and the power supply module 18 is disconnected, and the power supply module 18 stops supplying electric power to the power tool 10.

The signal switch SW2 at least enables the control module 21 to control the motor 13 to start. In some examples, one end of the signal switch SW2 is electrically connected to the control module 21; the control module 21 can obtain electrical signals indicating on or off state of the switch SW2. The signal switch SW2 is coupled to the trigger mechanism 161 to be actuated by the trigger mechanism 161. The signal switch SW2 is actuated by the trigger mechanism 161 to switch between the on state and the off state. The signal switch SW2 is electrically connected to the control module 21. When the signal switch SW2 is in different states, it outputs different electrical signals to the control module 21. The control module 21 outputs a control signal according to the electrical signal output from the signal switch SW2 to control the drive circuit 22 to control the motor 13 to start or not to start.

Figure 3A:
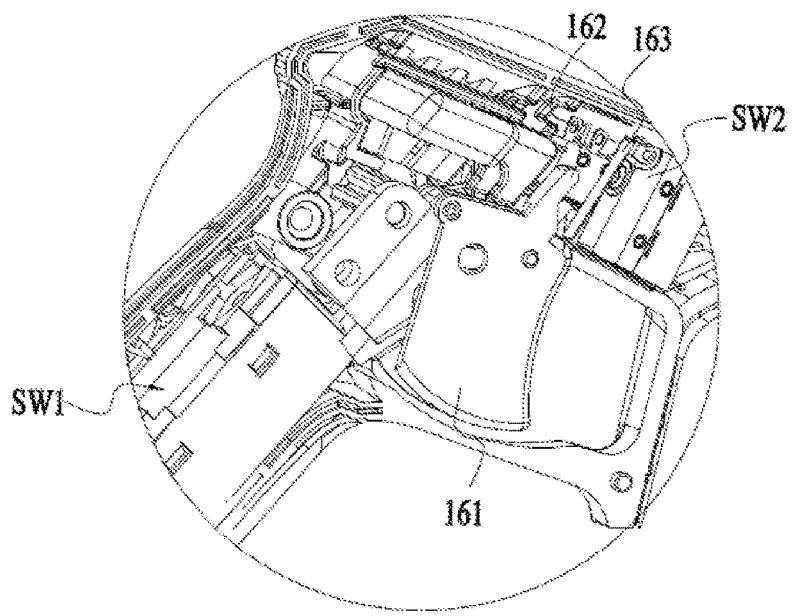
FIG. 3A is a structural diagram of an operating switch of the power tool shown in FIG. 1.
Figure 3B:
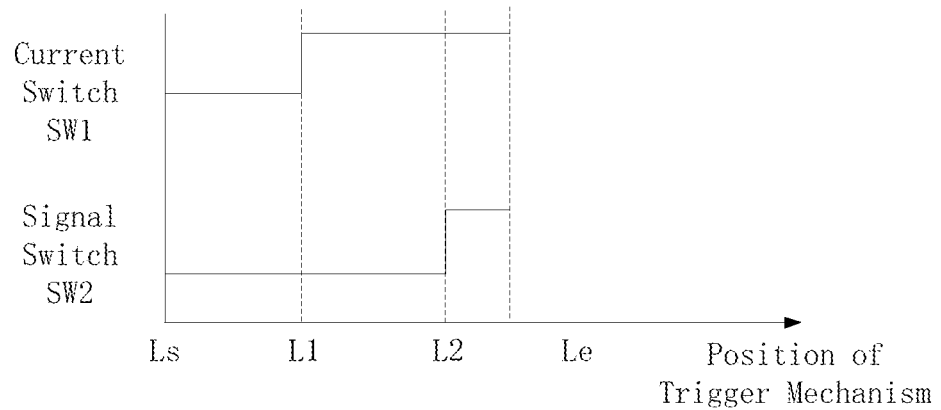
FIG. 3B is a schematic diagram of the relationship between the states of a current switch and a signal switch and the position of a trigger mechanism.

Referring to FIG. 3B, the trigger mechanism 161 may be actuated to reach different positions. When the trigger mechanism 161 is actuated to reach the first position L11, the current switch SW1 is actuated and changes its on-off state to enable the electrical connection between the power supply module 18 and the power tool 10; when the trigger mechanism 161 is actuated to reach the second position L12, the signal switch SW2 is actuated and changes its on-off state, so that the control module 21 controls the motor 13 to start. During the process that the trigger mechanism 161 is actuated to move from an initial position Ls1 to an end position Le1, the trigger mechanism 161 sequentially reaches a first position L11 and the second position L12. The "on-off state" refers to the on state and the off state of the current switch SW1 and the signal switch SW2. In other words, during the startup process of the motor 13, the current switch SW1 and the signal switch SW2 are actuated by the trigger mechanism 161 in a different order. The "initial position Ls1" of the trigger mechanism 161 in this application refers to the position where the operating switch 16 is not operated and the trigger mechanism 161 is not actuated, and the "end position Le1" refers to the position far from the initial position when the trigger mechanism 161 stops moving forward after the motor 13 is started. The "end position Le1" may be a third position L13, or may be a position farther from the original position Ls1 with respect to a third position L13. The trigger mechanism 161 is, for example, a trigger, and the "position" of the trigger mechanism 161 may refer to the angular position of rotating the trigger.

The current switch SW1 at least includes two pairs of contacts, and each pair of contacts is connected by a metal conductor. Optionally, the metal conductor is a copper sheet.

Figure 13:
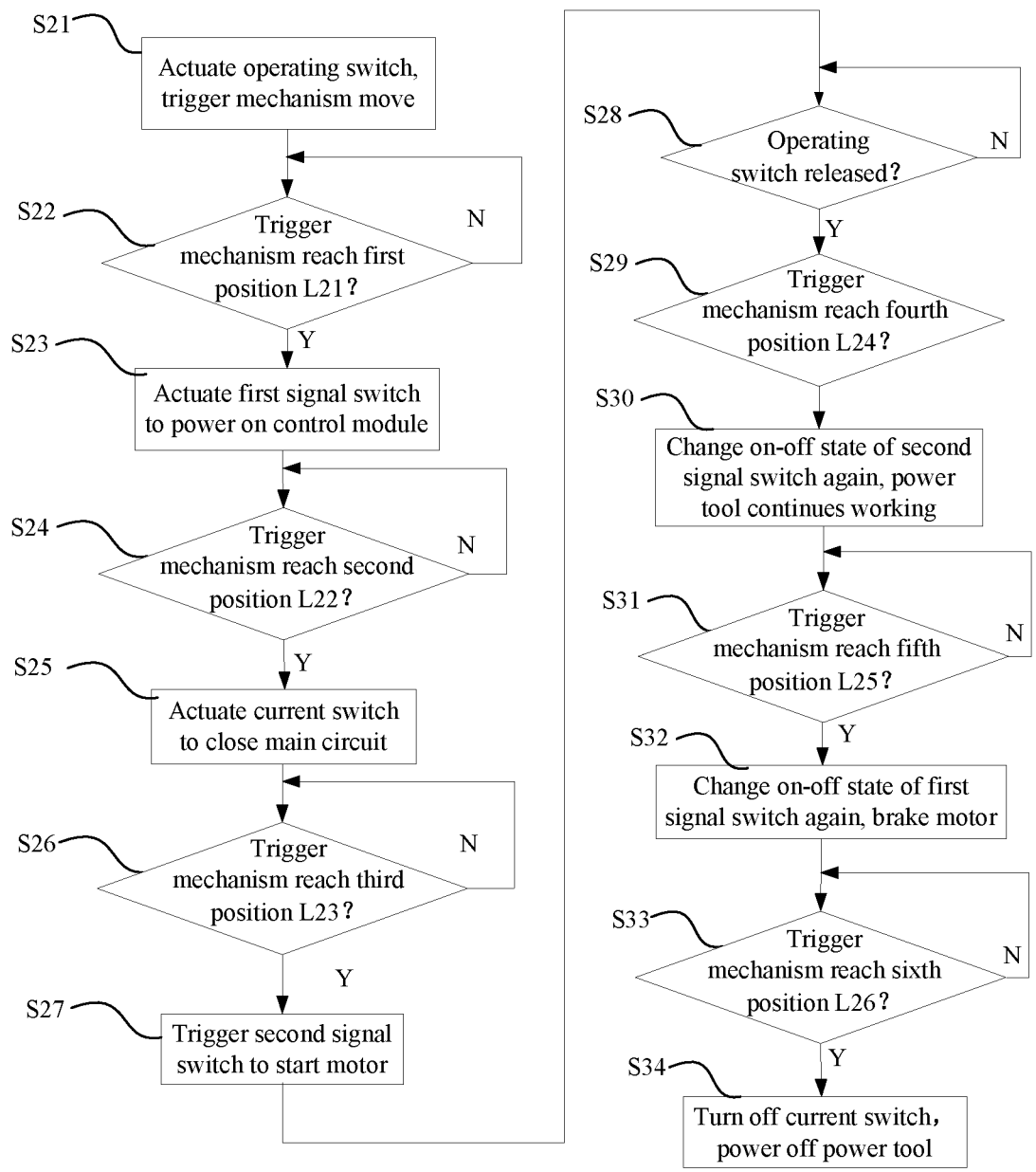
FIG. 13 is a flowchart of the working process of the operating switch and the working state of the power tool according to an example.

Referring to FIGS. 2 and 13, the current switch SW1 has two pairs of contacts, wherein contact A and contact B composes a pair of contacts; contact A' and contact B' composes a pair of contacts, wherein contact A and contact A' are movable contacts; contact B and contact B' are stationary contacts. Contact A may follow the movement of the trigger mechanism 161 to connect or disconnect contact B; contact A' may follow the movement of the trigger mechanism 161 to connect or disconnect contact B'. The two pairs of contacts are connected in parallel, and the current switch SW1 uses at least two pairs of contacts to carry all the current output by the power supply module 18, which prevents the contacts of the current switch SW1 from sparking due to carrying large currents.

In this example, a copper sheet may be used as the structure of electrical connection between contact A and contact B; another copper sheet may be used as the structure of electrical connection between contact A' and contact B'. The two branches connected to the copper sheet carry the current from the power supply module 18 in parallel. Because the copper sheet has good conductivity and good heat dissipation characteristics, this connection method, on the one hand, effectively solves the problem of sparking between the switch contacts at the moment of high current being turned on, and on the other hand, cools the current switch with the copper sheet arranged on the surface of the switch.

The trigger mechanism 161 is coupled to the movable contacts of the current switch SW1, so that the current switch SW1 is switched between the ON state and the OFF state by the trigger mechanism 161. In some examples, when the trigger mechanism 161 is pressed down such that the current switch SW1 is in the ON state, as shown in FIG. 2, contact A and contact B of the current switch SW1 are connected, contact A' and contact B' of the current switch SW1 are connected, at the same time, contact A' and contact B' of the current switch SW1 are electrically connected; the electrical connection between the power supply module 18 and the power tool 10 is turned on; the power supply module 18 supplies power to the power tool 10. In some examples, the power supply module 18 supplies power to the drive circuit 22, the control module 21 and motor 13. When the trigger mechanism 161 is pressed down such that the current switch SW1 is in the OFF state, as shown in FIG. 2, contact A and contact B of the current switch SW1 are electrically disconnected, at the same time, contact A' and contact B' of the current switch SW1 are electrically disconnected, the power supply module 18 stops supplying power to the power tool 10. In some examples, the power supply module 18 stops supplying power to the drive circuit 22, the control module 21, and the motor 13.

The trigger mechanism 161 is provided with a projection on the surface, and the projection is used to trigger the signal switch SW1. Referring to FIG. 3A, the above mentioned trigger mechanism 161 is provided with a projection 162 on the upper portion, the projection 162 can be pressed or released with the trigger mechanism 161, and correspondingly actuate the signal switch SW2 through a rocker 163, allowing the signal switch SW2 to be actuated by the trigger mechanism to switch between the on state and the off state. The signal switch SW2 outputs different electrical signals to the control module 21 in the on state and the off state, and the control module 21 outputs different drive signals according to the different electrical signals to control the drive circuit 22.

The current switch SW1 and the signal switch SW2 are actuated by the trigger mechanism 161 in a different order. During the process that the trigger mechanism 161 is actuated to move from the initial position Ls1 to the end position Le1, the trigger mechanism 161 sequentially reaches the first position L11 and the second position L12.

In some examples, after the operating switch 16 is manipulated and the trigger mechanism 161 is actuated, firstly, when the trigger mechanism 161 is actuated to reach the first position, the current switch SW1 is turned on, the main circuit is turned on, and the power tool 10 and the power supply module 18 are electrically connected, the power tool 10 is powered on; then, when the trigger mechanism 161 is actuated to reach the second position, the trigger mechanism 161 presses the signal switch SW2 through the projection 162 and the rocker 163 to switch it to the on state. When the signal switch SW2 is switched to the on state, the electrical signal (for example, current signal) generated is transmitted to the control module 21, and the control module 21 outputs drive signals in the form of PWM (Pulse Width Modulation) to the drive circuit 22 according to the electrical signals generated by the signal switch SW2 being actuated. Thus, the drive circuit 22 drives the motor 13 according to the drive signals, the motor 13 starts, and then the motor 13 enters normal operation.

Optionally, the current switch SW1 and the signal switch SW2 are configured as one integral structure. In other words, the current switch SW1 and the signal switch SW2 are integrated.

The control module 21 may be implemented as a DSP (Digital Signal Processor) chip, an ARM (Advanced RISC (Reduced Instruction Set Computer) Machine, RISC Microprocessor) chip, or a single-chip microcomputer (MCU, Microcontroller Unit) according to the internal data signal processing requirements of the power tool 10.

Figure 4:
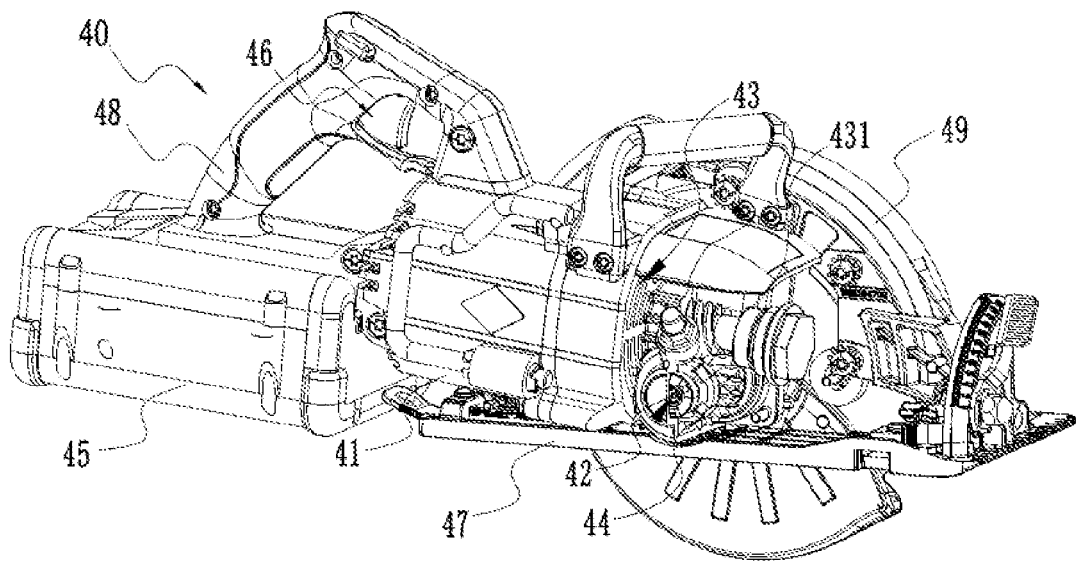
FIG. 4 is an external view of a power tool according to another example.

Referring to FIG. 4, another example of a power tool 40 takes a hand-held circular saw as an example, and the mechanical structure includes: a base plate 48, for contacting with a workpiece; a housing 41, the housing is mounted on the base plate 48; a saw blade guard 49, the blade guard 49 and the housing 41 being connected; a saw blade shaft 42 for supporting the saw blade to rotate within the saw blade guard 49 to cut the workpiece; a motor 43 disposed in the housing 41 including a stator, a rotor and a motor shaft 431, the motor shaft 431 being driven by the rotor of the motor 43; a transmission device 44, the transmission device 44 being configured to transmit the power output by the motor 43 to a tool accessory. For a circular saw, the tool accessory is a saw blade. In some examples, the transmission device 44 connects the motor shaft 431 and the saw blade shaft 42, transmitting the rotational movement of the motor shaft 431 to the saw blade shaft 42 to drive the saw blade to operate. The transmission device 44 may include a speed reduction mechanism, for example, an intermeshing worm gear mechanism. The worm gear mechanism may include gear structures with different gear ratios, or synchronous belt transmission structures with different synchronizing wheel radius. Optionally, the motor 43 is a brushless motor.

The hand-held circular saw further includes a handle 48 to be held by the user, the handle 48 can be formed by the housing 41, or can be formed or installed separately; an operating switch 46 for the user to operate. The operating switch 46 is arranged at the handle 48 for convenience. The operating switch 46 includes a trigger mechanism 461, and the trigger mechanism 461 can be actuated.

Figure 5:
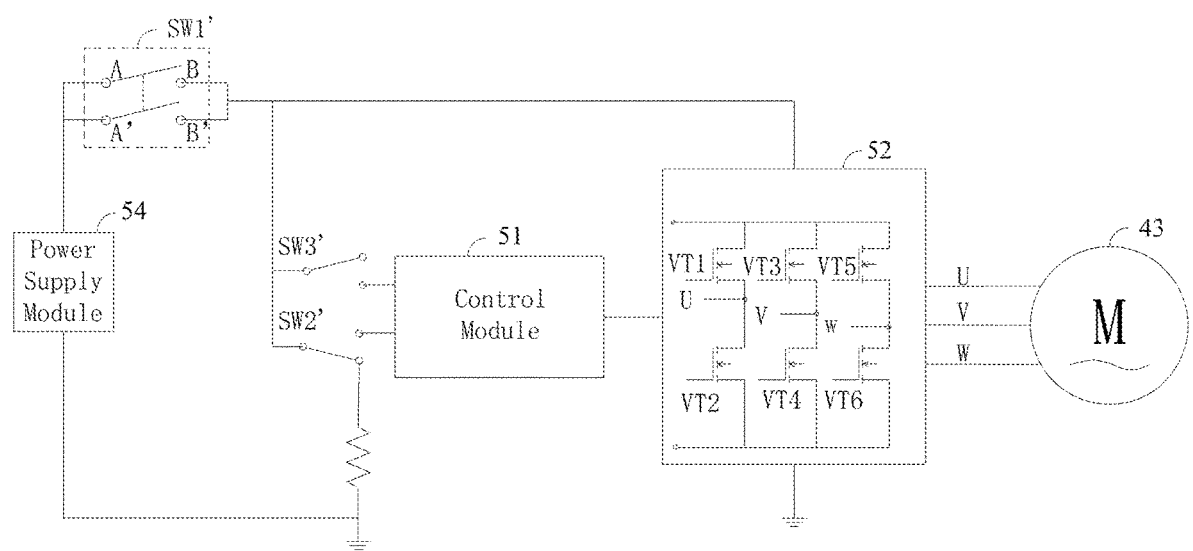
FIG. 5 is a schematic diagram of an example of a circuitry of the power tool shown in FIG. 4.

Referring to FIG. 5, to control the operation of the motor 43, the circuitry 50 of an example of a power tool 40 includes: a power supply module 54, a control module 51, a current switch SW1', a first signal switch SW2' and a second signal switch SW3' etc. Optionally, the power tool 40 further includes a drive circuit 52.

The cooperative working modes of the aforementioned circuit components of the power tool 40 are similar to the electronic components of the power tool 10 shown in FIGS. 1-3 and will not be repeated here. Compared with the aforementioned power tool 10, the power tool 40 of this example adds one signal switch, so the signal switch includes a first signal switch SW2' and a second signal switch SW3'. The first signal switch SW2' is coupled to the trigger mechanism 461 to be actuated by the trigger mechanism 461, and the second signal switch SW3' is coupled to the trigger mechanism 461 to be actuated by the trigger mechanism 461. The first signal switch SW2' is at least configured to output a signal to the control module 54 to brake the motor 43. The second signal switch SW3' is configured to output a signal to the control module 54 to start the motor 43.

Figure 6:
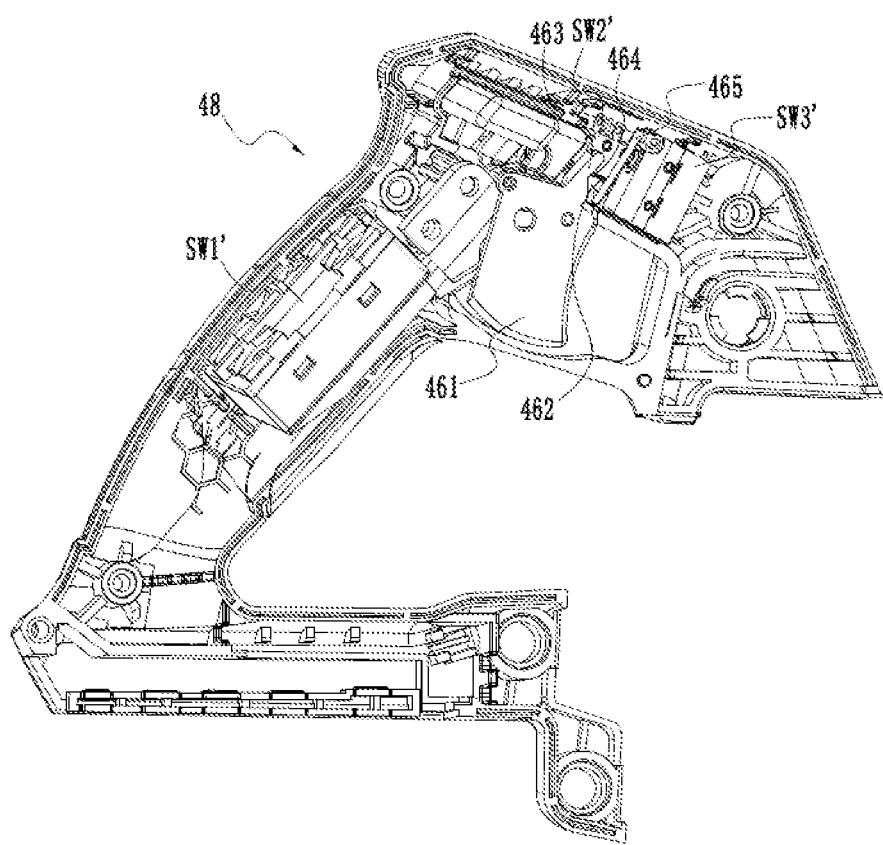
FIG. 6 is an internal structure diagram of a handle portion of the power tool shown in FIG. 4, wherein a trigger mechanism of an operating switch is in a first position.
Figure 8:
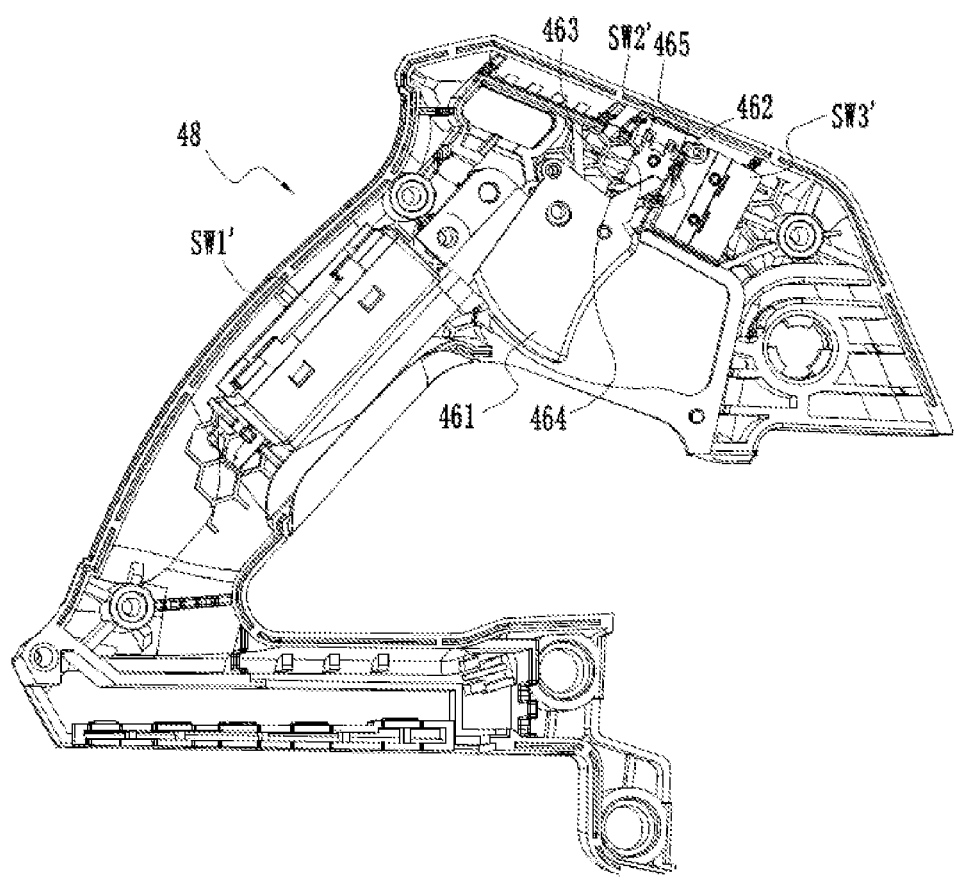
FIG. 8 is an internal structure diagram of the handle portion of the power tool shown in FIG. 4, in which the trigger mechanism of the operating switch is in a third position.

As shown in FIGS. 6 and 8, the operating switch 46 includes the above-mentioned trigger mechanism 461, the current switch SW1', the first signal switch SW2', and the second signal switch SW3'. When the trigger mechanism 461 is actuated to reach different positions, the on-off states of the current switch SW1', the first signal switch SW2', and the second signal switch SW3' will change accordingly with the position of the trigger mechanism 461, that is, the current switch SW1', the first signal switch SW2' and the second signal switch SW3' are respectively switched between the on state and off state according to the current position of the trigger mechanism 461. The trigger mechanism 461 is, for example, a trigger; and the "position" of the trigger mechanism 461 may refer to the angular position of rotating the trigger. The "on-off state" refers to the on state and off state of the current switch SW1', the first signal switch SW2', and the second signal switch SW3'.

The trigger mechanism 461 can be actuated to reach different positions. For example, when the trigger mechanism 461 is actuated to reach a first position L21, the first signal switch SW2' changes its on-off state; when the trigger mechanism 461 is actuated to reach a second position L22, the current switch SW1' changes its on-off state; when the trigger mechanism 461 is actuated to reach a third position L23, the second signal switch SW3' changes its on-off state. During the process that the trigger mechanism 461 is actuated to move from an initial position Ls2 to an end position Le2, the trigger mechanism 461 reaches the first position L21, the second position L22, and the third position L23 in sequence. The "initial position Ls2" of the trigger mechanism 461 in this application refers to the position where the operating switch 46 is not operated and the trigger mechanism 461 is not actuated, and the "end position Le2" refers to the position far from the initial position where the trigger mechanism 161 stops moving forward. The "end position Le2" may be the third position L23, or may be a position farther from the initial position Ls2 than the third position L23.

The surface of the trigger mechanism 461 is provided with a projection, and the projection is used to trigger the first signal switch SW2' and the second signal switch SW3'. In some examples, the trigger mechanism 461 is provided with a first projection 462 on the surface; the first projection 462 follows the movement of the trigger mechanism 461. When the trigger mechanism 461 moves to the first position L21, the first projection 462 triggers the first signal switch SW2' coupled to the first projection 462. Alternatively, when the trigger mechanism 461 moves to the first position L21, the first projection 462 triggers the first signal switch SW2' to power on the control module 51.

The trigger mechanism 461 is provided with a second projection 463 on the surface, the second projection 463 follows the movement of the trigger mechanism 461. When the trigger mechanism 461 moves to the third position L23, the second projection 463 triggers the second signal switches SW3' coupled to the second projection 463. The second signal switch SW3' outputs electrical signals to the control module 51. The control module 51 controls the drive circuit 52 to start the motor 43 according to the electrical signals output by the second signal switch SW3'.

When the trigger mechanism 461 is actuated to reach the second position L12, the current switch SW1' is actuated; the on-off state of the current switch SW1' changes so that the power tool 40 and the power supply module 54 are electrically connected.

In some examples, the operating switch 46 further includes a first rocker 464 and a second rocker 465. The first rocker 464 is connected to the first signal switch SW2'. When the trigger mechanism 461 is actuated to reach the first position L21, the first projection 462 and the first rocker 464 move relative to each other, and the first projection 462 presses or moves away from the first rocker 464, the first rocker 464 actuates the first signal switch SW2' to change the on-off state, and the on-off state of the first signal switch SW2' changes. The second rocker 465 is connected to the second signal switch SW3'. When the trigger mechanism 461 is actuated to reach the third position L23, the second projection 463 actuates the second rocker 465, and the second rocker 465 actuates the second signal switch SW3', and the on-off state of the second signal switch SW3' changes.

Referring to FIGS. 6-10, the working process of the above example will be described.

The user operates the operating switch 46, the trigger mechanism 461 is actuated to start moving, and the trigger mechanism 461 first moves to the first position L21 (FIG. 6). For example, the trigger mechanism 461 rotates from the initial position Ls2 to an angular position of 12°. At this time, the first projection 462 and the first rocker 464 move relatively, the first signal switch SW2' is actuated, and the first rocker 464 actuates the first signal switch SW2' to change the on-off state. Optionally, when the trigger mechanism 461 is moved to the first position L21, the first projection 462 triggers the first signal switch SW2' to power on the control module 51. At this time, since the trigger mechanism 461 has not reached the second position L22 and the third position L23, the current switch SW1' and the second signal switch SW3' are not actuated, and the motor 43 will not start.

In some examples, when the trigger mechanism 461 is not actuated, the first switch signal SW2' is in the ON state; at this time the first projection 462 is pressed against the first rocker 464. At first, when the trigger mechanism 461 reaches the first position L21, the first projection 462 releases the first rocker 464, and the first signal switch SW2' is turned off. In other examples, when the trigger mechanism 461 is not actuated, the first signal switch SW2' is in the off state; at this time, the first projection 462 is not in contact with the first rocker 464. When the trigger mechanism 461 is actuated to reach the first position L21, the first projection 462 presses the first rocker 464, and the first signal switch SW2' is turned on.

Figure 7:
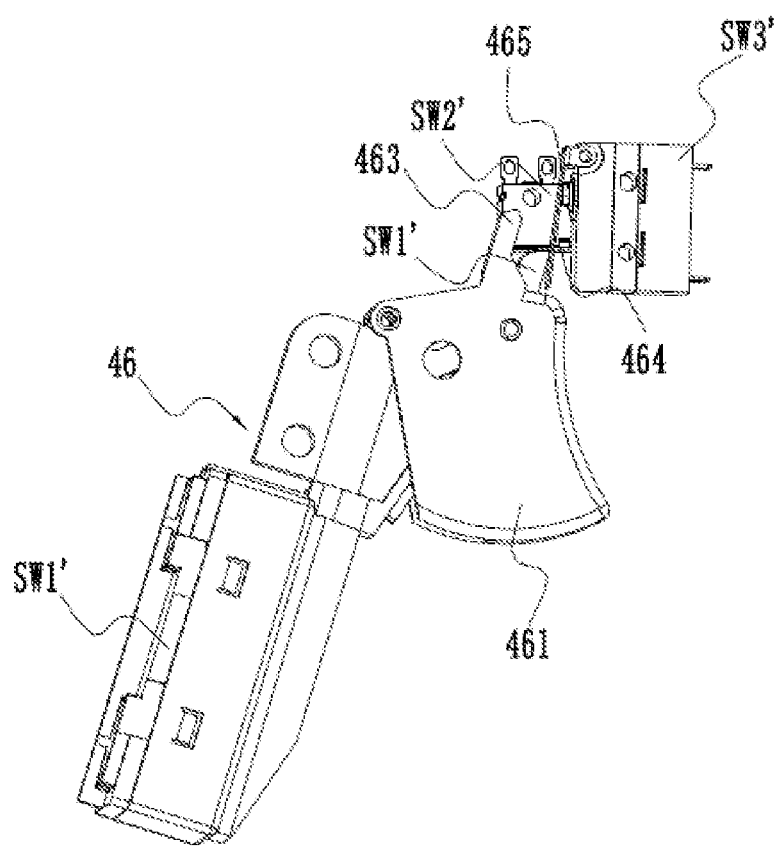
FIG. 7 is a structural diagram of the operating switch of the power tool shown in FIG. 4, wherein the trigger mechanism of the operating switch is in a second position.

The user further presses the trigger mechanism 461 to reach the second position L22 (FIG. 7). For example, the trigger mechanism 461 rotates from the initial position to an angular position of 24°. At this time, the current switch SW1' is switched to the on state. At this time, the first signal switch SW2' is still in the aforementioned state after being actuated. Since the trigger mechanism 461 has not yet reached the third position L23, the second signal switch SW3' will not be actuated, the second signal switch SW3' will not generate a power-on signal. At this time, the current switch SW1' passes a large current, but because the second signal switch SW3' is not actuated and no power-on signal is generated, therefore, the motor 43 still does not start.

Referring to FIGS. 5 and 7, the trigger mechanism 461 is coupled to contact A, contact B, contact A', and contact B' of the current switch SW1'. When the trigger mechanism 461 pressed to reach the second position L22, the current switch SW1' is switched to the on state, contact A and contact B of the current switches SW1' thereby form an electrical connection, contact A' and contact B' also form an electrical connection thereby; the electrical connection between the power supply module 54 and the power tool 40 is turned on, and the power supply module 54 can output electric power to provide electricity to the power tool 40. Contact A and contact B, contact A' and contact B' of the current switch SW1' are respectively connected, the current switch SW1 carries all the current output by the power supply module 43. Similar to the previous example, in order to avoid sparking between the contacts of the current switch SW1 due to a large current, in this example, a copper sheet can be used as the electrical connection structure between contact A and contact B, and another copper sheet can be used as the electrical connection structure between contact A' and contact B'. The two branches connected to the copper sheet carry the current from the power supply module 18 in parallel. Because the copper sheet has good conductivity and good heat dissipation characteristics, this connection method, on the one hand, effectively solves the problem of sparking between the switch contacts at the moment of high current being turned on, and on the other hand, cools the current switch with the copper sheet arranged on the surface of the switch.

The user further presses the trigger mechanism 461 to reach the third position (FIG. 8), and the trigger mechanism 461 rotates from the initial position to an angular position of 27°. At this time, the second projection 463 actuates the second rocker 465, and the second rocker 465 actuates the second signal switch SW3'. The second signal switch SW3' is actuated to change the on-off state and generate and output a power-on electrical signal to control module 51. At this time, the current switch SW1' is still in the on state, the first signal switch SW2' is still in the aforementioned state after being actuated, and the control module 51 receives the electrical signal from the second signal switch SW3' to control the motor 43 to start running. In some examples, the control module 51 outputs a drive signal to the drive circuit 52, and the drive circuit 52 starts the motor 43.

Figure 9:
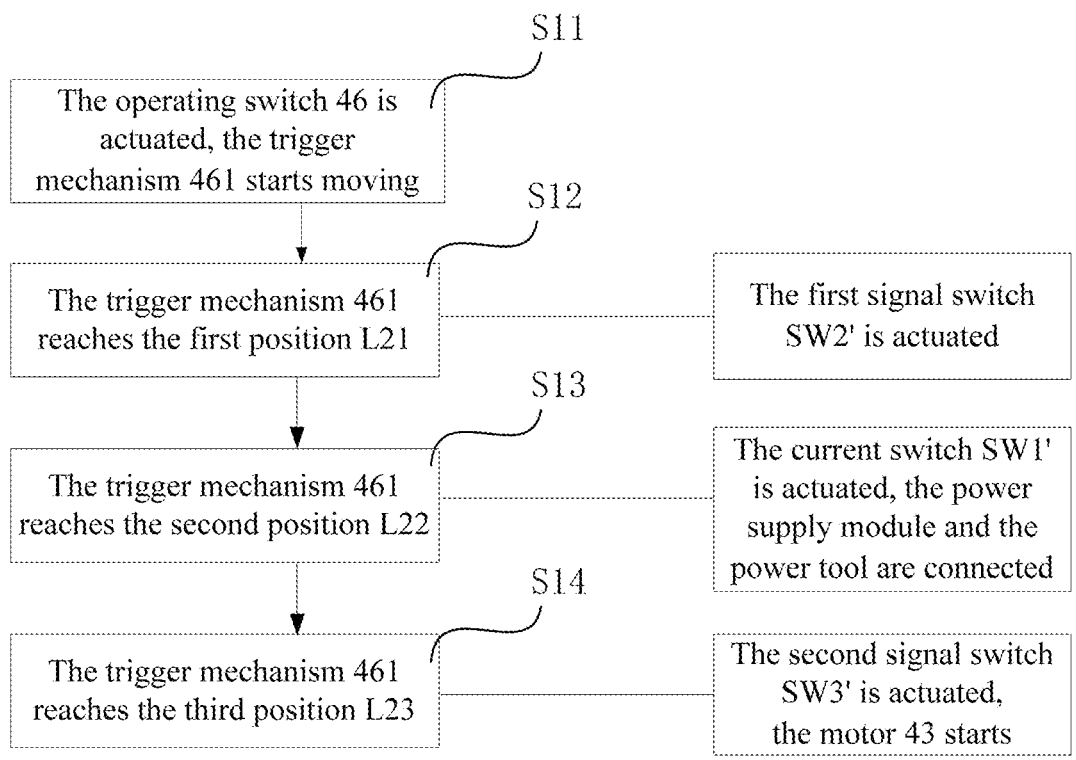
FIG. 9 is a flowchart of the working process of the trigger mechanism being actuated to move from an initial position to an end position.
Figure 11A:
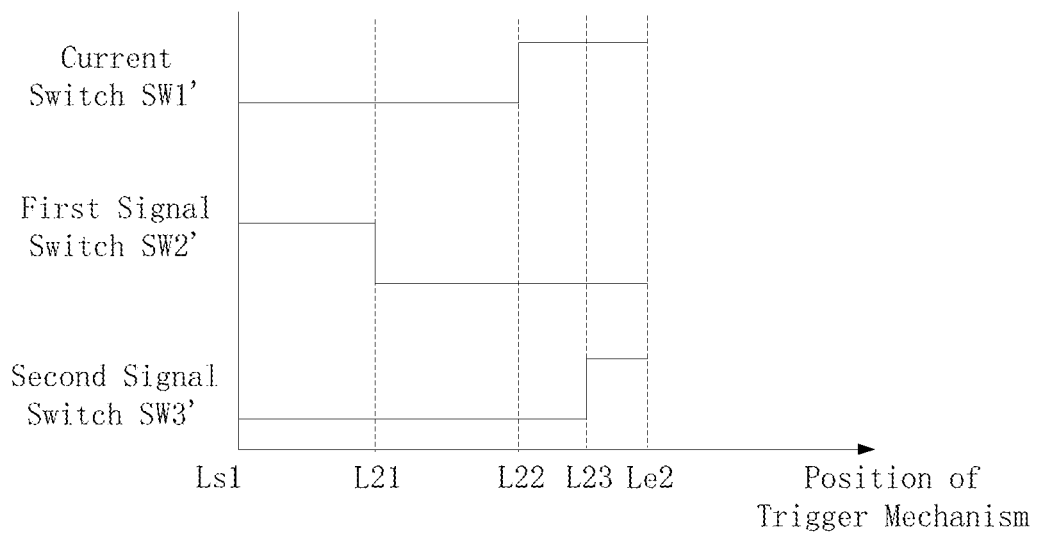
FIG. 11A is a schematic diagram of the state of each switch and the position of the trigger mechanism when the trigger mechanism is actuated to move from the initial position to the end position.

Referring to FIGS. 9 and 11A, the process that the trigger mechanism 461 is actuated to move from the initial position Ls2 to the end position Le2 is as follows:

Step S11: the operating switch 46 is actuated, and the trigger mechanism 461 starts moving after being pressed.

Step S12: the trigger mechanism 461 reaches the first position L21.

The first signal switch SW2' is actuated to change the on-off state. Optionally, the first signal switch SW2' is actuated to power the control module 51.

Step S13: the trigger mechanism 461 reaches the second position L22.

At this time, the current switch SW1' is switched to the on state, the power supply module 54 and the power tool 40 are connected, and current flows through the current switch SW1'.

Step S14: the trigger mechanism 461 reaches the third position; the second signal switch SW3' is actuated to change the on-off state so that the control module 51 controls the motor 43 to start.

When the user releases the trigger mechanism 461, the trigger mechanism 461 is released and restored, and at the same time drives the first projection 462 and the second projection 463 to return. When the user releases the trigger mechanism 461, the trigger mechanism 461 returns from the end position Le2 to the initial position Ls2, and sequentially reaches a fourth position L24, a fifth position L25, and a sixth position L26. In some examples, when the trigger mechanism 461 reaches the fourth position L24, the second signal switch SW3' first changes the on-off state again, but because the first signal switch SW2' is still in the aforementioned state after being actuated, that is, the first signal switch SW2' has not changed its state again and will not output a brake signal. The motor 43 continues to run and the power tool 40 works normally; then, the trigger mechanism 461 reaches the fifth position L25, and the first signal switch SW2' changes the on-off state again, outputs a brake signal to the control module 51, while the second signal switch SW3' is still in the aforementioned state after the change again, the control module 51 controls the motor 43 to brake; finally, the trigger mechanism 461 reaches the sixth position L26, the current switch SW1' is turned off, and the power tool 40 is powered off.

Figure 10:
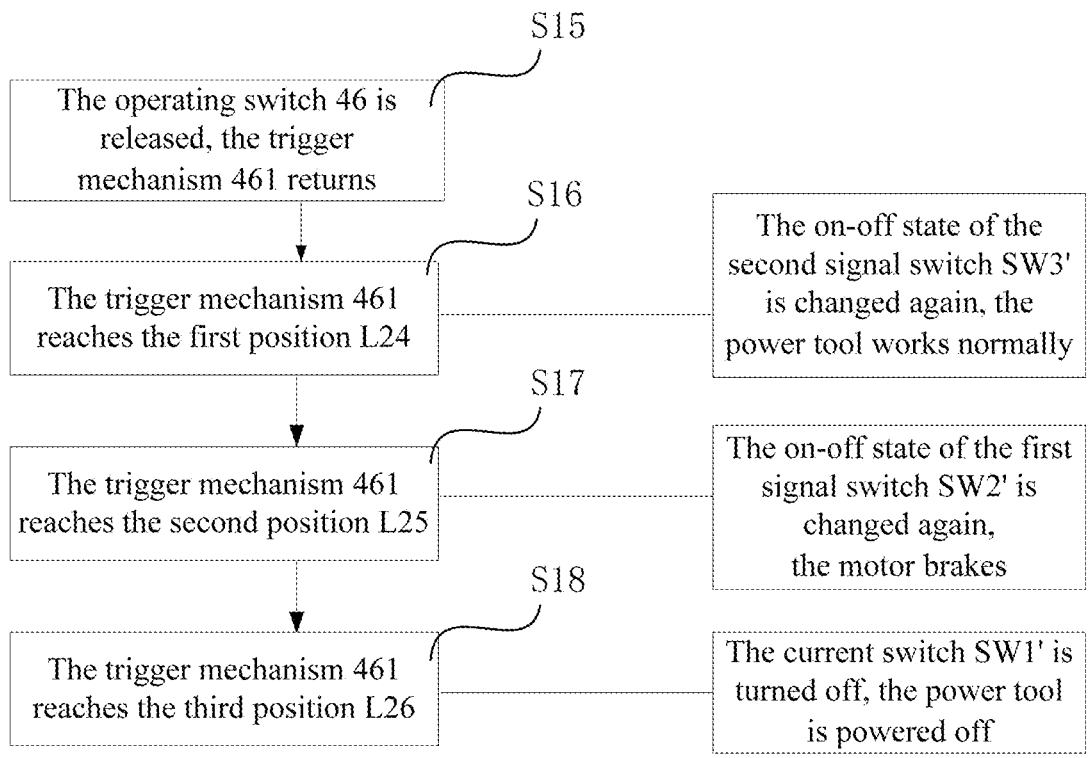
FIG. 10 is a flowchart of the working process of the trigger mechanism being actuated to move from the end position to the initial position.
Figure 11B:
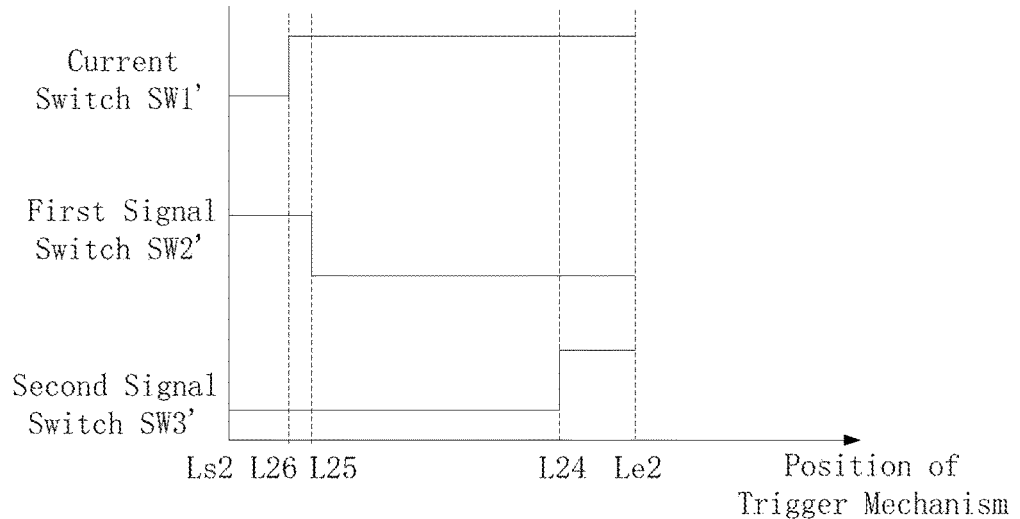
FIG. 11B is a schematic diagram of the state of each switch and the position of the trigger mechanism when the trigger mechanism is actuated to move from the end position to the initial position.

Referring to FIGS. 10 and 11B, the process that the trigger mechanism 161 is released from the end position Le2 to the initial position Ls2 is as follows:

Step S15: the operating switch 46 is released, and the trigger mechanism 161 is released to start the return journey.

Step S16: the trigger mechanism 461 reaches the fourth position L24.

The on-off state of the second signal switch SW3' is changed again, however, since the first signal switch SW2' is still in the aforementioned state after being actuated, that is, the first signal switch SW2' has not changed its state again, and will not output a brake signal, the motor 43 continues to run and the power tool 40 works normally.

Step S17: the trigger mechanism 461 reaches the fifth position L25, the on-off state of the first signal switch SW2' is changed again so that the control module 51 controls the motor 43 to brake.

Step S18: the trigger mechanism 461 reaches the sixth position L26, the current switch SW1' is turned off, and the power tool 40 is powered off.

The current switch SW1' is turned off after the first signal switch SW2' and the second signal switch SW3' are turned off, which ensures that the control module 51 can still work for some time to control the braking time and braking current, so that the braking of the power tool is under control, and the braking process is more stable and safer.

Due to the return journey difference resulted from the mechanical structure of the trigger mechanism 461, the first position L21, second position L22, and third position L23 in the process of the trigger mechanism 461 moving from the initial position Ls2 to the final position Le2 are different from the fourth position L24, the fifth position L25, and the sixth position L26 in the process of the trigger mechanism 461 moving from the final position Le2 to the initial position Ls2.

Optionally, the fifth position L25 is closer to the initial position Ls2 with respect to the second position L22. That is, compared with the second position L22 reached during the advancement of the trigger mechanism 461, the fifth position L25 reached during the return journey of the trigger mechanism 461 needs to be released by a greater distance. The advantage is that, when braking is required, the trigger mechanism 461 needs to be released for a longer travel distance to be able to trigger the brake of the motor 43, so as to prevent the user from accidentally actuating the trigger mechanism and causing undesired consequences. For example, the first position L21, the second position L22, and the third position L23 in the process of the trigger mechanism 461 moving from the initial position Ls2 to the end position Le2 are 12° angular position, 24° angular position, and 27° angular position, respectively. The fourth position L24, the fifth position L25, and the sixth position L26 in the process of the trigger mechanism 461 moving from the final position Le2 to the initial position Ls2 are 22° angular position, 7° angular position, and 5° angular position, respectively.

The first projection 462 and the second projection 463 are staggered to each other, so that the trigger mechanism 461 actuates the first signal switch SW2' and the second signal switch SW3' at different times, so that the first signal switch SW2' and the second signal switch SW3' will not be actuated at the same time, thereby generating electrical signals representing different information to the control module 51. In the present example, the first signal switch SW2' is used to power up the control module 51 during the startup process of the power tool 10 and generate a brake signal during the braking process of the power tool 10. When the control module 51 receives the brake signal, it controls the motor 43 to brake. The second signal switch SW3' is used to generate a power-on signal during the startup process of the power tool. Upon receiving the power-on signal, the control module 51 determines that the current switch SW1' has been turned off, and then controls the drive circuit 52 to control the operation of the motor 43.

Figure 12:
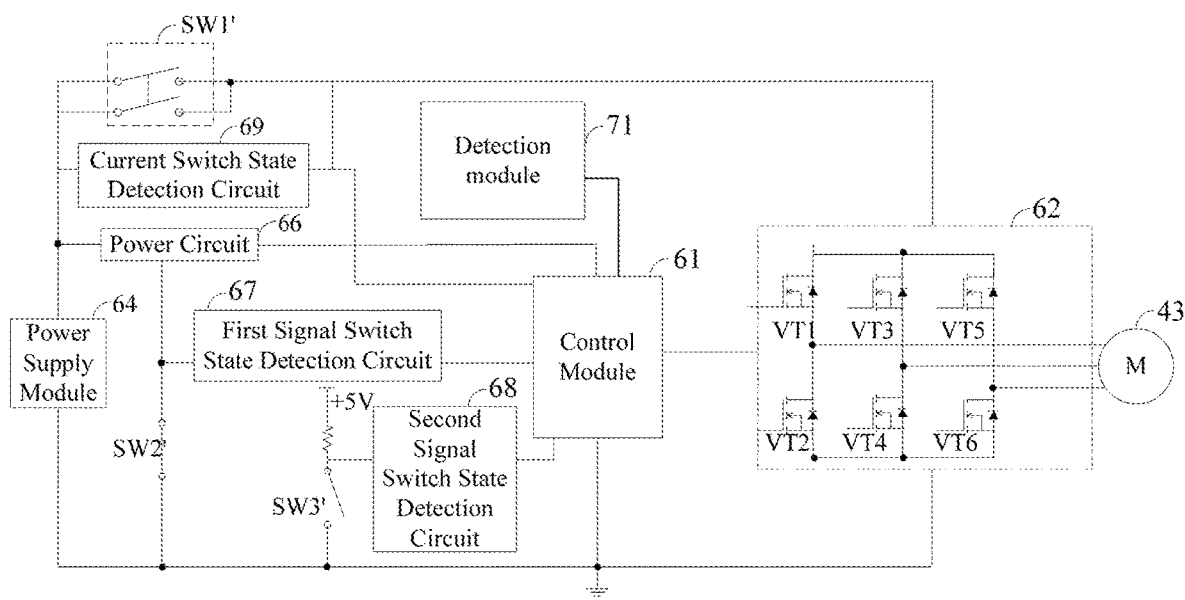
FIG. 12 is a schematic diagram of an example of a circuitry of the power tool shown in FIG. 4.

Referring to FIG. 12, as another example, the circuitry of the power tool 40 includes: a control module 61, a drive circuit 62, a motor 43, a power supply module 64, a power circuit 66, a current switch SW1', a first switch signal SW2', a second signal switch SW3', a first signal switch state detection circuit 67, a second signal switch state detection circuit 68, and a current switch state detection circuit 69.

In this example, the control module 61, the drive circuit 62, the motor 62, and the power supply module 64 are similar to those of the aforementioned example, and their cooperative functioning methods are similar, and will not be repeated here.

In this example, the drive circuit 62 is electrically connected to or disconnected to the power supply module 64 through the current switch SW1'.

The power circuit 66 is configured to convert the electric power from the power supply module 64 into electric power for the control module 61 and each switch state detection circuit.

In this example, when the trigger mechanism 461 is actuated to move from the initial position Ls2 to the end position Le2, that is, during the startup process of the power tool, the first signal switch SW2' is configured to trigger the power circuit 66 to work, thereby to provide power to the control module 61, and to power on the power tool 40; and when the trigger mechanism 461 moves from the end position Le2 to the initial position Ls2, the first signal switch SW2' is configured to provide a brake signal to the control module 61 to brake the motor 61.

The first signal switch state detection circuit 67 is used to detect the on-off state of the first signal switch SW2' and send the detected state information of the first signal switch SW2' to the control module 61, and the control module 61 controls the motor 43 to brake according to the state of the first signal switch SW2'.

The current switch state detection circuit 69 is electrically connected to the current switch SW1' for detecting the on-off state of the current switch SW1'. The first signal switch state detection circuit 67 is connected to the first signal switch SW2' for detecting the on-off state of the first signal switch SW2'. The second signal switch state detection circuit 68 is connected to the first signal switch SW3' for detecting the on-off state of the second signal switch SW3'.

The other ends of the first signal switch state detection circuit 67, the second signal switch state detection circuit 68, and the current switch state detection circuit 69 are all connected to the control module 61, and the control module 61 controls the operation of the motor 43 according to the received electrical signals of each switch state detection circuit. With the above-mentioned switch state detection circuits, it is possible to effectively prevent the power tool from malfunction when the mechanical structure of the operating switch fails and the above-mentioned current switch or signal switches is not effectively actuated or is falsely actuated. Through the software method formed by the above-mentioned hardware switches and the switch state detection circuits, a double protection is formed to avoid undesired malfunction of the power tool 40.

Referring to FIG. 13, in an example, a control method of the power tool 40 includes:

Step S21: actuate the operating switch 46, and the trigger mechanism 461 starts to move.

Step S22: determine whether the trigger mechanism 461 has reached the first position L21, if yes, go to step S23; if not, proceed to step S22.

Step S23: actuate the first signal switch SW2' to change its on-off state so that the control module 61 is powered on.

In a specific implementation, the first signal switch SW2' brings the power supply circuit 69 to work, and powers on the control module 61.

Step S24: determine whether the trigger mechanism 461 has reached the second position L22, if yes, go to step S25; if not, proceed to step S24.

Step S25: switch the current switch SW1' to the on state, the power supply module 64 is electronically connected with the power tool, the main circuit of the power tool 40 is closed, and current flows through the current switch SW1'.

Step S26: determine whether the trigger mechanism 461 has reached the third position L23, if yes, go to step S27; if not, proceed to step S26.

Step S27: actuate the second signal switch SW3' to change its on-off state, and the motor 43 has started.

In a specific implementation, the second signal switch SW3' is actuated to change the on-off state, the control module 61 receives the power-on signal, determines that the current switch SW1' is turned on, and the control module 61 controls the drive circuit 62 to start the motor 43.

Step S28: determine whether the operating switch 46 has been released, if yes, go to step S39; if not, proceed to step S28.

Step S29: determine whether the trigger mechanism 461 has reached the fourth position L24, if yes, go to step S30; if not, proceed to step S29.

Step S30: change the on-off state of the second signal switch SW3' again, and the power tool 10 continues working.

After the trigger mechanism 461 reaches the fourth position L24, the on-off state of the second signal switch SW3' changes again, but because the first signal switch SW2' is still in the aforementioned state after being actuated, that is, the first signal switch SW2' has not changed its state again and will not output a brake signal. The motor 43 continues to run and the power tool 40 works normally.

Step S31: determine whether the trigger mechanism 461 has reached the fifth position L25, if yes, go to step S32; if not, proceed to step S31.

Step S32: change the on-off state of the first signal switch SW2' again, start the braking process, and the motor 43 brakes.

Step S33: determine whether the trigger mechanism 461 has reached the sixth position L26, if yes, go to step S34; if not, proceed to step S33.

Step S34: switch the current switch SW1' to the off state, and the power tool 40 is powered off.

Therefore, the present application provides the first signal switch state detection circuit 67, the second signal switch state detection circuit 68, and the current switch state detection circuit 69, and the control module 61 controls the motor 43 to start, run, brake or stop according to the received electrical signals of each switch state detection circuit, which can effectively prevent the power tool from malfunction when any one of the operating switch, the trigger mechanism, the above-mentioned current switch, and the two signal switches is not effectively actuated or is falsely actuated. Through the software method formed by the above-mentioned hardware switches and the switch state detection circuits, a double protection is formed to avoid undesired malfunction of the power tool.

Figure 14:
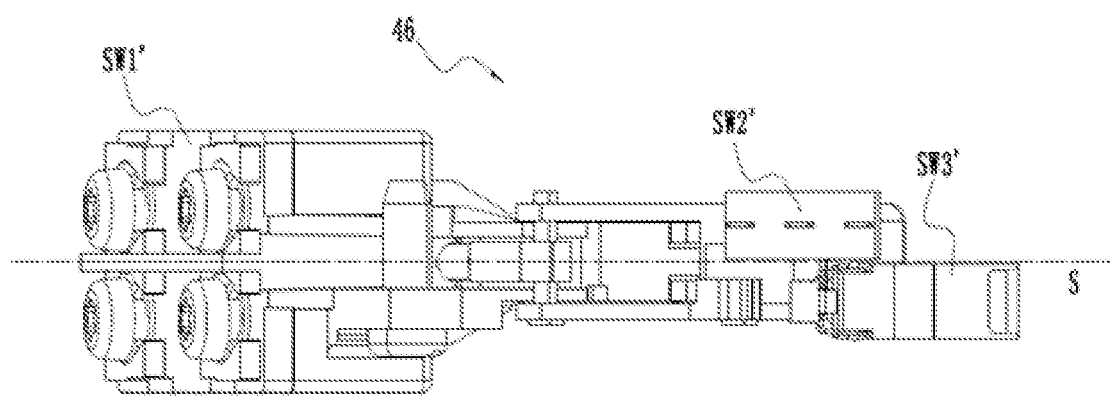
FIG. 14 is a structural diagram of the operating switch of the power tool shown in FIG. 4.
Figure 15:
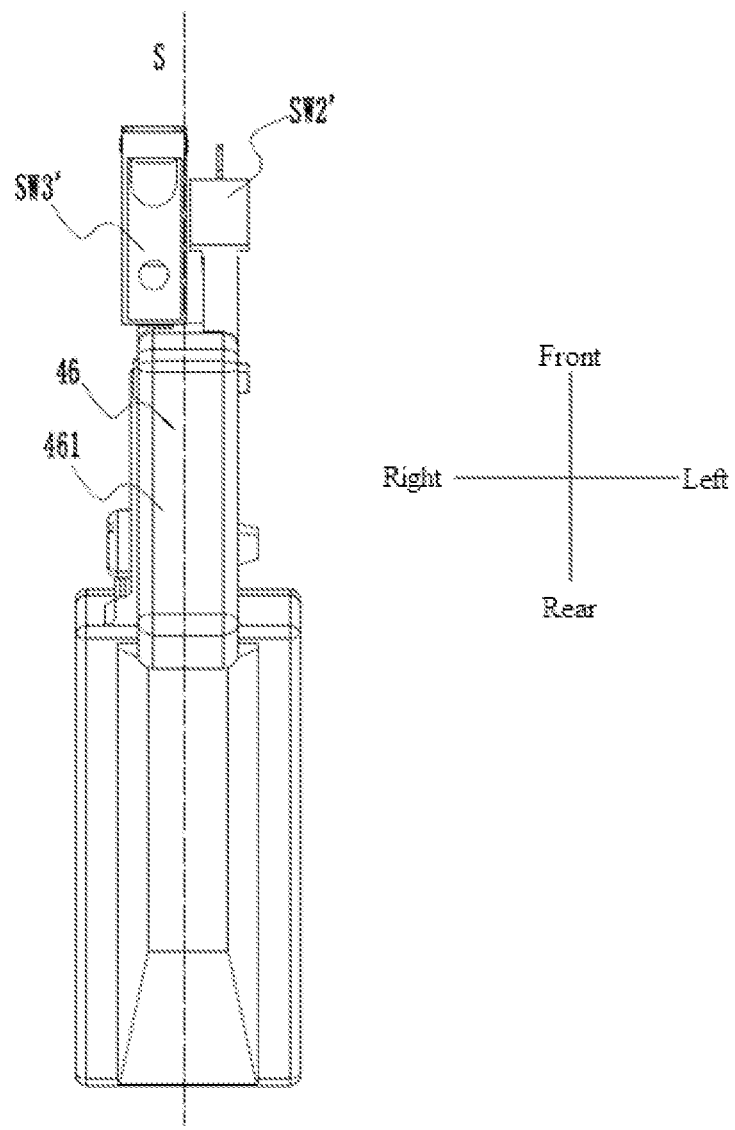
FIG. 15 is a structural diagram of the operating switch of the power tool shown in FIG. 4 from another perspective.
Figure 16:
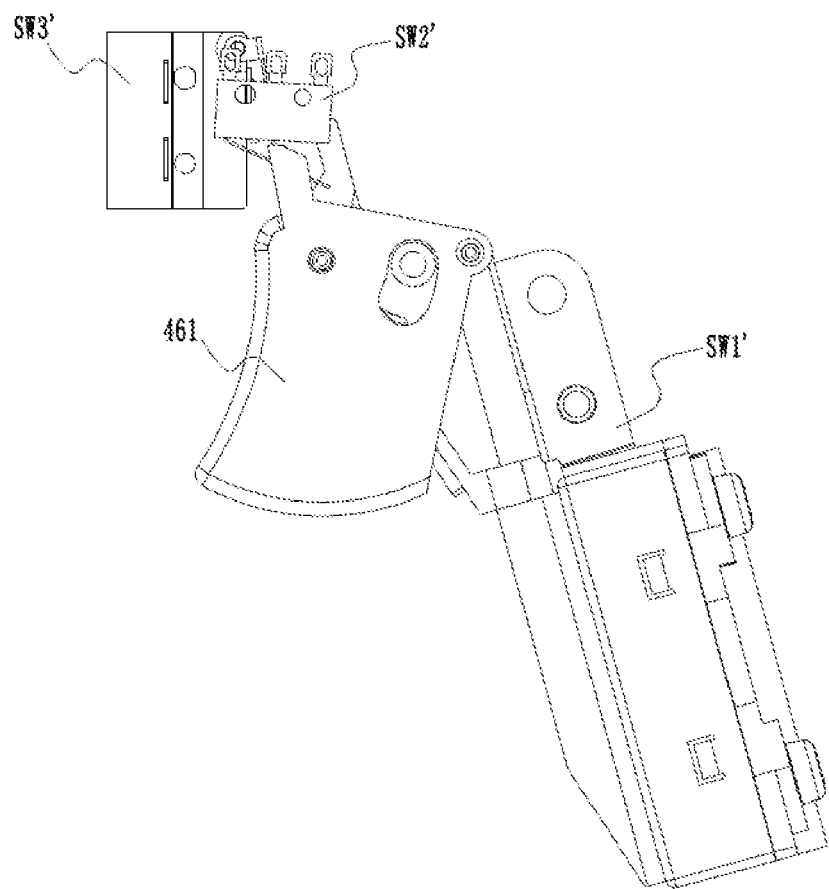
FIG. 16 is a structural diagram of the operating switch of the power tool shown in FIG. 4 from another perspective.

Referring to FIGS. 14-16, the plane that bisects the handle 48 is defined as the handle central plane S, and the first signal switch SW2' and the second signal switch SW3' are distributed on both sides of the handle central plane S. Optionally, the handle 48 is arranged symmetrically about the handle central plane S. Optionally, the handle 48 is not strictly symmetrical about the handle central plane S, but minimizes the space volume or surface area of the two parts of the handle 48 bisected by the handle central plane S. The projection of the first signal switch SW2' on handle central plane S and the projection of the second signal switch SW3' on handle central plane S at least partially overlap. This is advantageous in that the first signal switch SW2' and the second signal switch SW3' occupy a smaller space, so that the handle 48 is more compact.

For the convenience of explanation, "front", "rear", "left" and "right" are defined as shown in FIGS. 14 and 15, the "front", "rear", "left" and "right" are the "front", "rear", "left" and "right" of the power tool 40, as well as the "front", "rear", "left" and "right" of the handle 48. In FIG. 15, the handle central plane S is perpendicular to the paper surface.

Existing brushless DC motors drive the drive circuit through a control module. A capacitor for reducing ripple and performing filtering is arranged in parallel at both ends of the drive circuit. The capacitor will be charged at the moment the current switch is closing, and a relatively large charging current will be generated during charging. When the current switch is not completely closed, the charging current will cause a huge impact on the current switch contacts, which can easily cause the contacts to burn and stick, and the switch to fail.

Figure 17:
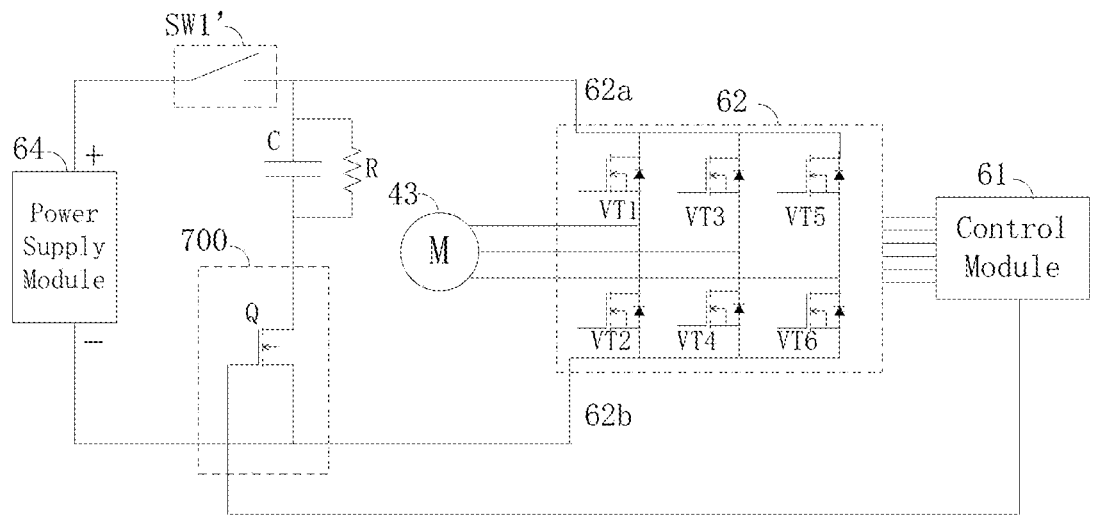
FIG. 17 is a simplified diagram of an example of the circuitry of the power tool shown in FIG. 12.

In the power tool 40 of the present application, the above-mentioned problems can be avoided. FIG. 17 shows a simplified diagram of the circuitry 60 of the power tool 40 shown in FIG. 12.

The power tool 40 further includes a power storage element C. The power storage element C is used to reduce ripple and perform filtering, so as to avoid the surge voltage generated when the control module 61 controls the drive circuit 62 through the pulse width modulation method and damage the drive switch. In particular, under a large current, the ripple generated by the drive switch increases when it turns on and off, and the power storage element C can reduce the ripple current in the circuit and perform filtering. The power storage element C is electrically connected to one end of the current switch SW1' and the first driving end 62b of the drive circuit 62. In some examples, the power storage element C is an electrolytic capacitor. Optionally, a resistor R is also connected in parallel at both ends of the power storage element C to provide another discharge circuit for the power storage element C, so that the power storage element C can discharge faster when discharging, and the power stored in the power storage element C can also get discharged through a switch element Q. In some examples, the resistance value of the resistor is equal to or greater than 1 megohm. The advantage of this is that the power storage element C can be guaranteed to work normally without being affected by the resistor R.

To protect the current switch SW1', the power tool 40 further includes a switch circuit 700 to avoid the charging current of the power storage element C from impacting the current switch SW1'. The switch circuit 700 is connected in series with the power storage element C and then connected in parallel with the drive circuit 62.

The control module 61 is configured to: turn on the switch circuit 700 with a delay after the current switch SW1' is turned on. In other words, only after the current switch SW1' is turned on, does the control module 61 output a control signal to the switch circuit 700 to turn on the electrical connection between the power storage element C and the power supply module 64, thereby delaying the charging of the power storage element C. In this example, after the current switch SW1' is completely closed, the control module 61 outputs a control signal to the switch circuit 700 to charge the power storage element C. Optionally, the switch circuit 700 includes a switch element Q, and the switch element Q is connected in series with the power storage element C and is electrically connected with the control module 61. The switch element Q is used to control the charging of the energy storage element C such that the charging of the energy storage element C is delayed until the current switch SW1' is turned on; in some examples, the control module 61 outputs a control signal to the switch element Q to charge the energy storage element C after the current switch SW1' is completely closed. This method can avoid the impact of high current on the switch contacts of the switch SW1' and the power storage element C, which may cause sparking and sticking of the switch contacts and reduce the usage life of the power storage element C.

Optionally, the switch element Q is a field effect transistor, the gate of which is electrically connected to the control module 61, one of the drain or the source is connected in series with the power storage element C, and the other of the drain or source is electrically connected to the drive circuit 62.

Figure 18:
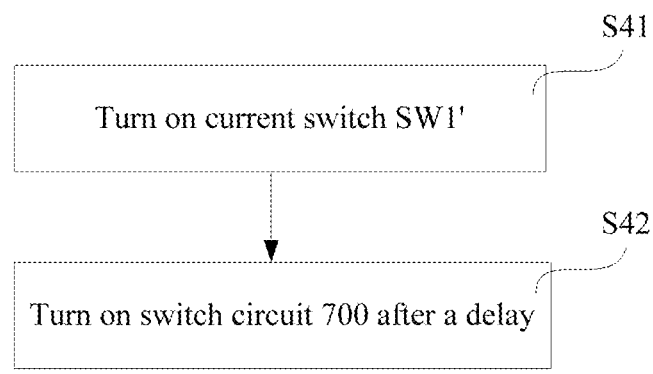
FIG. 18 is a flowchart of the method for starting the power tool shown in FIG. 17.

Referring to FIG. 18, in an example, the method for starting the power tool 10 includes:

Step S41: turn on the current switch SW1'.

In a specific implementation, the user actuates the trigger mechanism 461 so that the current switch SW1' is switched to the on state, so that the power supply module 64 and the drive circuit 62 are electrically connected.

Step S42: turn on the switch circuit 700 after a delay.

After the current switch SW1' is turned on, turn on the switch circuit 700 after waiting for a predetermined time period, which is greater than or equal to the time period from when the current switch SW1' starts to close until it is completely closed. Optionally, the value of the predetermined time period ranges from 50 milliseconds to 200 milliseconds. Optionally, the value of the predetermined time period ranges from 70 milliseconds to 120 milliseconds. Such a setting not only ensures that the current switch SW1' is completely closed, but also guarantees the user's hand feeling.

In a specific implementation, after the current switch SW1' is turned on, the control module 61 outputs a control signal to the switch element Q in the switch circuit 700 to turn on the switch element Q, so that the power storage element C starts to get charged. In this way, the power storage element C can be recharged after the current switch SW1' is completely closed, thereby avoiding the impact of high current on the switch contacts of the switch SW1' and the power storage element C, which may cause sparking and sticking of the switch contacts and reduce the usage life of the power storage element C.

After the current switch SW1' is closed, the control module 61 outputs a control signal to the drive circuit 62 such that the timing of starting the motor 43 can be set reasonably according to actual needs. Optionally, the control module 61 outputs a control signal to the drive circuit 62 to start the motor 13 after the power storage element C is almost fully charged or fully charged. Optionally, the duration from the start of switching the current switch SW1' to the start of the rotation of the motor 43 has a value range from 50 milliseconds to 250 milliseconds, so as to guarantee the user's hand feeling.

Figure 19:
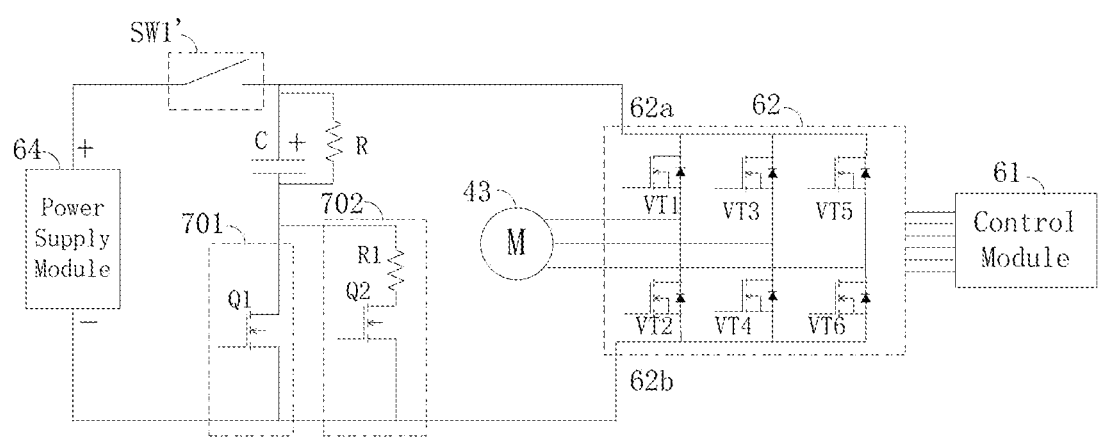
FIG. 19 is a simplified diagram of an example of the circuitry of the power tool shown in FIG. 12.

Referring to FIG. 19, according to another example, the simplified diagram of the circuitry of the power tool 40 differs from FIG. 17 in that another switch circuit 702 is added in this example. In other words, in this example, the power tool 40 has two switch circuits, which are a first switch circuit 701 and a second switch circuit 702, respectively.

The first switch circuit 701 is connected in series with the power storage element C and then connected in parallel with the drive circuit 62. The control module 61 is configured to delay turning on the first switch circuit 701 after the current switch SW1' is turned on. The first switch circuit 701 includes: a first switch element Q1, which is connected in series with the power storage element C and electrically connected with the control module 61.

The second switch circuit 702 is connected in parallel with the first switch circuit 701 and is electrically connected to the control module 61. In other words, after the second switch circuit 702 and the first switch circuit 701 are connected in parallel, the parallel connection of the two is then connected in series with the power storage element C.

The first switch circuit 701 allows a first current to flow through, and the second switch circuit 702 allows a second current to flow through; the current value of the first current is greater than the current value of the second current.

The control module 61 is further configured to: turn on the second switch circuit 702 to allow the second current to charge the power storage element C after the current switch SW1' is turned on and before the first switch circuit 701 is turned on. That is, after the current switches SW1' turned on, the control module 61 first controls the first switch circuit 701 to turn on, and then controls the second switch circuit 702 to turn on, so that the power storage element C is charged with a small current after the current switch SW1' is turned on, and then the power storage element C works normally to reduce ripple and perform filtering, so as to avoid the impact of high current on current switch SW1', prevent the switch contacts from sparking and sticking, and prolong the usage life of the electrolytic capacitor.

The first switch circuit 701 includes: a first switch element Q1, which is connected in series with the power storage element C and electrically connected with the control module 61. Optionally, one end of the first switch element Q1 is electrically connected with the power storage element C, and the other end of the first switch element Q1 is electrically connected with the second end 62b of the drive circuit 62.

Optionally, the first switch element Q1 is a field effect transistor, the gate of which is electrically connected to the control module 61, and the other one of the source or drain is electrically connected to the second end 62b of the drive circuit 62.

The second switch circuit 702 includes: a second switch element Q2, which is electrically connected to the control module 61; and a current limiting element, which is connected in series with the second switch element Q2, the current limiting element is a resistive element, and the parameters of the resistive element can be adjusted to control the charging current of the power storage element C. The second switch element Q2 is first connected in series with the current limiting element and then connected in parallel with the first switch circuit 701. The first switch circuit 701 and the second switch circuit 702 are two independent branches, both of which can be used to control the charging of the power storage element C.

Optionally, the second switch element Q2 is a field effect transistor, and the current limiting element is a resistor R1.

Figure 20:
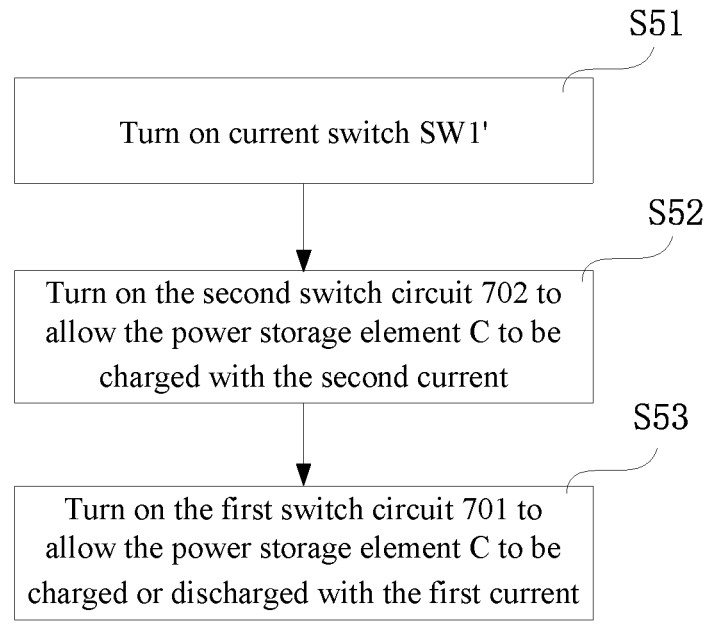
FIG. 20 is a flowchart of the method for starting the power tool shown in FIG. 19.

Referring to FIG. 20, in an example, the method for starting the power tool 40 includes:

Step S51: turn on the current switch SW1'.

In a specific implementation, the user actuates the trigger mechanism 461 so that the current switch SW1' is in the on state; in this way, the power supply module 64 and the drive circuit 62 are electrically connected.

Step S52: turn on the second switch circuit 702 to allow the power storage element C to be charged with the second current.

In a specific implementation, after the current switch SW1' is turned on, the control module 61 may immediately turn on the second switch circuit 702 to allow the power storage element C to be charged with the second current. In a specific implementation, the control module 61 outputs a control signal to the switch element Q2 of the second switch circuit 702 to turn it on. In this way, due to the existence of the current limiting element, the second switch circuit 702 allows a small current to flow through, and the power storage element C is charged with the small current. In this way, there is no need to delay turning on the second switch circuit 702, because charging the power storage element C with a small current will not generate a large current impacting the contacts of the current switch SW1'.

Step S53: turn on the first switch circuit 701 to allow the power storage element C to be charged or discharged with the first current.

After the second switch circuit 702 is turned on, the control module 61 then outputs a control signal to the first switch circuit 701 to turn on the first switch circuit 701. Optionally, after the second switch circuit 702 is turned on, the control module 61 outputs a control signal to the first switch circuit 701 to turn on the first switch circuit 701 after waiting for a predetermined time period. The value of the predetermined time period ranges from 5 milliseconds to 20 milliseconds. After the predetermined time period, the power storage element C will not generate a large charging current. In this way, the user's hand feeling can be guaranteed, and the charging current of the power storage element C will not impact the contacts of the current switch SW1'.

Optionally, after the second switch circuit 702 and the first switch circuit 701 are turned on, the control module 61 outputs a control signal to the drive circuit 62 to start the motor 43.

The timing at which the control module 61 outputs the control signal can be set reasonably according to actual needs. Optionally, the control module 61 outputs a control signal to the drive circuit 62 to start the motor 43 after the power storage element C is fully charged or almost fully charged with the second current. In this way, it can be ensured that there will not be a large current impact on the switch contacts, nor will the user's feeling be affected. Optionally, the duration from the start of switching the current switch SW1' to the start of the rotation of the motor 43 has a value range from 50 milliseconds to 250 milliseconds.

Optionally, before the first switch circuit 701 is turned on, the control module 61 outputs a control signal to turn off the switch element Q2 of the second switch circuit 702.

The first switch circuit 701 and the second switch circuit 702 are two independent circuits for controlling the charging of the power storage element C, and are used for controlling the current of the power storage element C.

Through the two switch circuits (701, 702) provided above, the charging timing and the charging current of the power storage element C can be controlled, and the switch contacts of the current switch SW1' can be effectively prevented from loading a large current when the current switch SW1' is not completely closed. Moreover, the charging current of the power storage element C can be changed by adjusting the resistor R1, and the circuit of the power storage element C will not be affected by the current limiting element when the power tool 40 is working normally, thereby reducing the ripple reduction and filtering performance. In addition, in this example, by arranging two switch elements Q1 and Q2, the switch element is saved from having to withstand the impact of the charging current of the power storage element C during every starting up, as well as the charging or discharging current of the power storage element C during the normal operation of the drive circuit 62. Therefore, the requirements for selecting the switch element is not very high, which reduces the cost, and also alleviates the problem of poor performance and reduced reliability of the switch element after bearing many current impacts.

In this application, the power tool 40 includes a transmission device 44; the transmission device 44 is configured to transmit torque output by the motor 43 to the tool accessory. The transmission device 44 is provided with a lubricant that at least partially solidifies when the temperature of the power tool 40 is lower than a predetermined temperature threshold. Especially, if the transmission device is a worm gear mechanism that meshes with each other, when starting in a low temperature environment, the starting torque of the power tool 40 increases due to the solidification of lubricating oil. At this time, if it is forced to start with the normal starting method, a larger starting current will be required. Excessive starting current can easily damage the electronic switch elements (e.g., field effect transistors) in the power tool, causing overcurrent protection and unsuccessful startup of the power tool 40.

The power tool 40 further includes a detection module 71 (FIG. 12), which is connected with the control module 61, for detecting relative parameters during the start-up process of the motor 43, including at least one of the current of the motor 43, the temperature of the power tool 40, and the output voltage of the power supply module 64.

Figure 21:
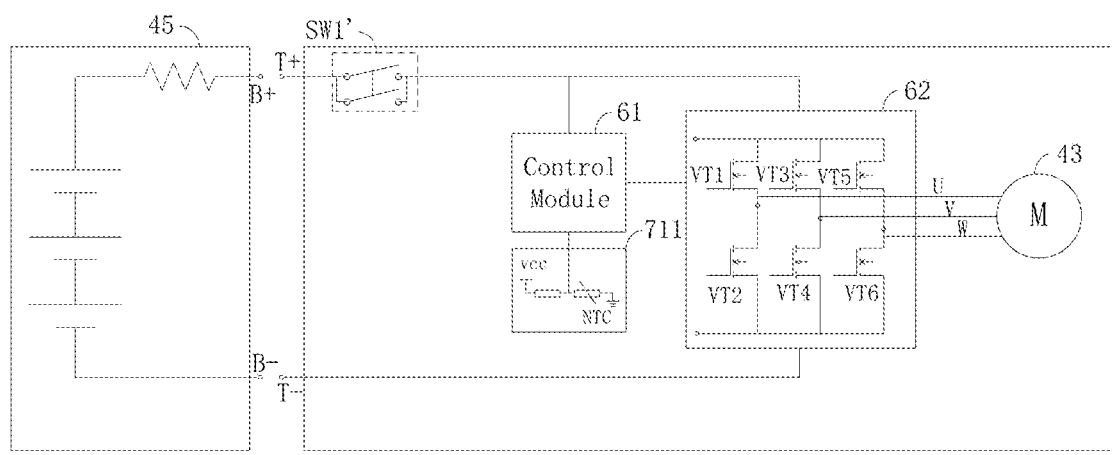
FIG. 21 is a simplified diagram of an example of the circuitry of the power tool shown in FIG. 12.

FIG. 21 is a simplified diagram of the circuitry of the power tool 40 shown in FIG. 12. The detection module 71 includes a temperature sensor 711, which is disposed inside the power tool 40, for detecting the temperature of the power tool 40. Optionally, the temperature sensor 711 may be a thermistor, especially an NTC thermistor.

The temperature sensor 711 is electrically connected with the control module 61. The control module 61 is configured to: control the startup speed of the motor 43 according to the temperature of the power tool 40. When the temperature of the power tool 40 is higher than a predetermined temperature threshold, the rotational speed of the motor 43 is gradually increased to a predetermined rotational speed at the first rate of change; when the temperature of the power tool 40 is lower than the predetermined temperature threshold, the rotational speed of the motor 43 is gradually increased to the predetermined rotational speed at the second rate of change lower than the first rate of change.

Optionally, the value of the predetermined temperature threshold ranges from −20° C. to 10° C.

In an example, the ratio of the first rate of change to the second rate of change is greater than or equal to 2.

In some examples, the temperature sensor 711 is disposed inside the power tool 40 close to the drive switch (VT1, VT2, VT3, VT4, VT5, and VT6) of the drive circuit 62, so as to detect the temperature of the drive switch. The control module 61 is further configured to control the drive circuit 62 to stop driving the motor 43 when the temperature of the drive switch is higher than a second predetermined temperature threshold. The second predetermined temperature threshold is higher than the first predetermined temperature threshold. Optionally, the value of the second predetermined temperature threshold ranges from 60° C. to 90° C. In this way, the temperature sensor 711 can be configured to detect environment temperature to adopt a low temperature control strategy for the motor 43 at low temperatures, and to detect the temperature of the drive switch to stop the motor 43 when the temperature of the motor 43 is too high. There is no need to set up two additional temperature detection circuits or temperature sensors, which not only saves costs, but also simplifies the circuitry design.

In an example, the power supply module 64 includes a battery pack 45, and the battery pack 45 is detachably mounted to the power tool 40 for providing electric power for the power tool 40. The battery pack 45 includes a plurality of electrically connected cells, and the cells can be repeatedly charged and discharged. The battery pack 45 also includes a positive power supply terminal B+ and a negative power supply terminal B−. The power tool 40 includes a positive connection terminal T+ and a negative power supply T−, which are respectively configured to connect with the positive power terminal B+ and the negative power terminal B− of the battery pack 45 to transmit electric power. Of course, the power supply module 64 may also include an AC power source. The power tool 40 uses AC power supply. The power supply module 64 also includes some power conversion circuits for converting AC power into electric power for the power tool 40.

The present application also discloses a method for starting a power tool, including: obtaining the temperature of the power tool 40; and control the starting speed of the motor 43 according to the temperature of the power tool 40.

In a specific implementation, when the temperature of the power tool 40 is higher than the first predetermined temperature threshold, the motor 43 is controlled to gradually increase the rotational speed of the motor 43 at a first rate of change; when the temperature of the power tool 40 is lower than the predetermined temperature threshold, the rotational speed of the motor 43 is gradually increased to a final rotational speed at a second rate of change lower than the first rate of change. The final rotational speed is the rotational speed at which the power tool 40 runs at a constant speed.

In an example, a ratio of the first rate of change to the second rate of change is greater than or equal to 2.

Optionally, the value of the predetermined temperature threshold ranges from −20° C. to 10° C.

In actual operation, this can be achieved by controlling the duty cycle of the PWM signal output by the module 61. In some examples, the first rate of change of the rotational speed of the motor 43 corresponds to the first rate of change of the duty cycle of the PWM signal, and the second rate of change of the rotational speed of the motor 43 corresponds to the second rate of change of the duty cycle of the PWM signal. The second rate of change of the duty cycle is lower than the first rate of change of the duty cycle. Optionally, the ratio of the first rate of change of the duty cycle to the second rate of change of the duty cycle is greater than or equal to 2.

Figure 22:
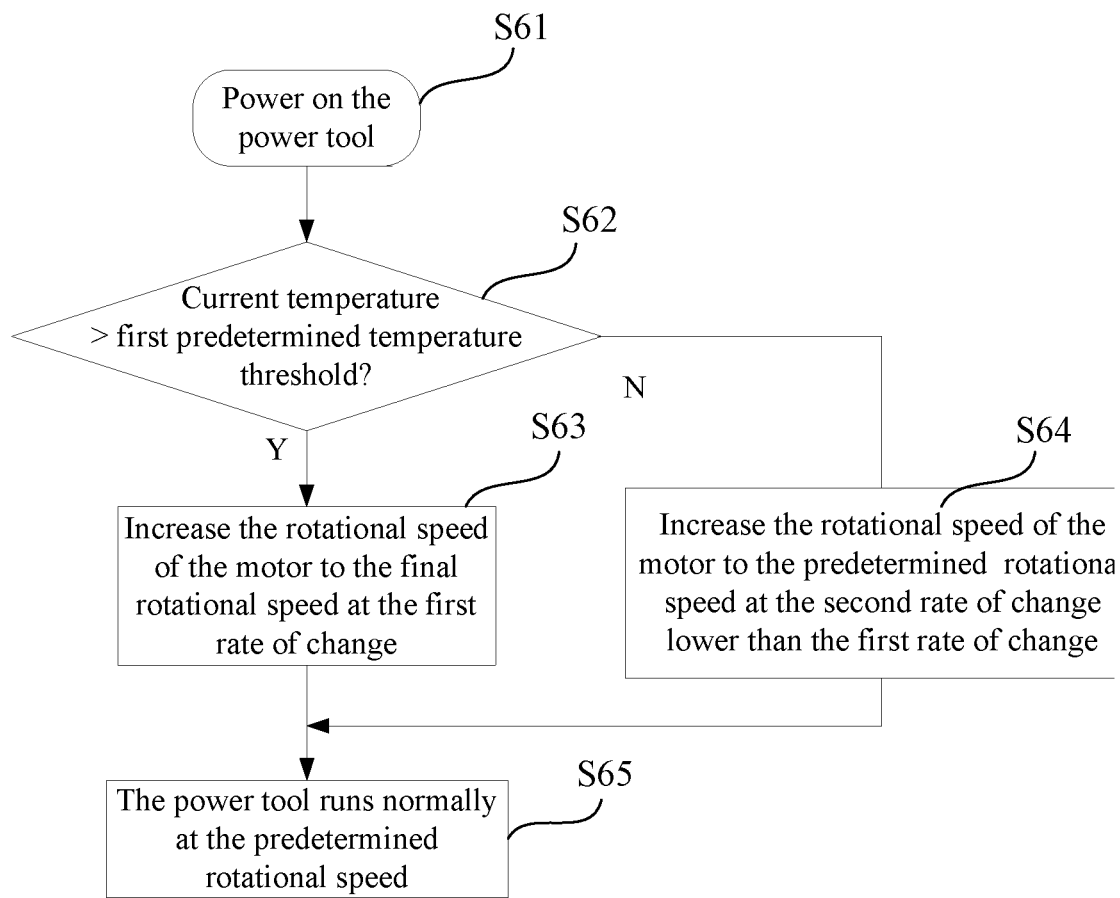
FIG. 22 is a flowchart of the method for starting the power tool shown in FIG. 21.

Referring to FIG. 22, in an example, according to the method for starting the power tool 40, the power tool 40 is started in the following steps:

Step S61: power on the power tool.

Step S62: obtain the temperature of the power tool and determine whether the current temperature of the power tool 40 is higher than the first predetermined temperature threshold, if yes, go to step S43, otherwise go to step S44.

Step S63: in a normal starting mode, gradually increase the rotational speed of the motor 43 to the final rotational speed at the first rate of change, and the power tool 40 works normally at the final rotational speed.

Step S64: in a low temperature starting mode, gradually increase the rotational speed of the motor 43 to the predetermined rotational speed at the second rate of change lower than the first rate of change.

Step S65: the power tool 40 has started, that is, the motor 43 runs normally at the predetermined speed, and the power tool 40 works normally.

The aforementioned example can ensure the normal and safe startup of the power tool 40 under low temperature conditions. Setting the temperature sensor 711 to directly detect the environment temperature of the power tool 40 enables the timely recognition of whether the working environment of the power tool 40 is in a low temperature environment that requires a large starting torque. When the temperature sensor 711 detects a temperature lower than the predetermined threshold temperature, reduce the rate of change of the starting speed of the motor 43, thereby reducing the starting current of the motor 43, and avoiding the problem of increased starting torque at low temperature and increased starting current, which causes the drive switch to be damaged or the power tool 40 to enter the overcurrent protection and start unsuccessfully.

Figure 23:
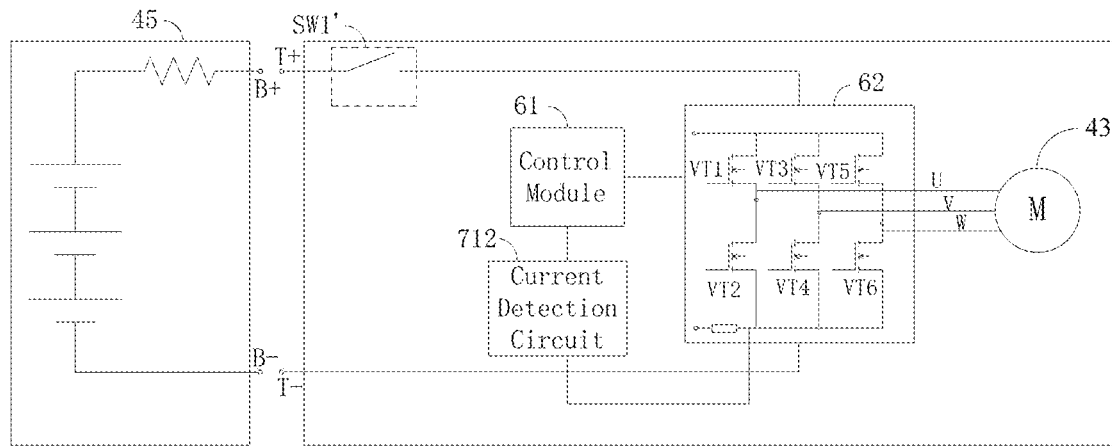
FIG. 23 is a simplified diagram of an example of the circuitry of the power tool shown in FIG. 12.

FIG. 23 is a simplified diagram of an example of the circuitry of the power tool 40 shown in FIG. 12, wherein the detection module 71 includes a current detection circuit 712, and the current detection circuit 712 is electrically connected to the windings of the motor 43 through a detection resistor that detects the current of the motor 43. As an optional solution, the current detection circuit 712 detects the phase current of the motor 43 by sampling the single current of the DC bus. The current detection circuit 712 is electrically connected with the control module 61.

The control module 61 controls the starting speed of the motor 43 according to the detection result of the current detection circuit 712: when the current of the motor 43 is lower than the predetermined current threshold, gradually increase the rotational speed of the motor 43 to the predetermined rotational speed at the first rate of change; when the current of the motor 43 is higher than the predetermined current threshold, gradually increase the rotational speed of the motor 43 to the predetermined rotational speed at the second rate of change lower than the first rate of change.

In an example, the ratio of the first rate of change to the second rate of change is greater than or equal to 2.

Optionally, the value of the predetermined current threshold ranges from 30A to 120A.

The present application also discloses a method for starting a power tool, including: obtaining the current of the power tool 40; and control the starting speed of the motor 43 according to the current of the power tool 40.

In a specific implementation, when the current of the motor 43 of the power tool 40 is lower than the predetermined current threshold, the motor 43 is controlled to gradually increase the rotational speed of the motor 43 at the first rate of change; when the current of the motor 43 of the power tool 40 is higher than the predetermined current threshold, gradually increase the rotational speed of the motor 43 to the predetermined rotational speed at the second rate of change lower than the first rate of change.

In an example, the ratio of the first rate of change to the second rate of change is greater than or equal to 2.

Optionally, the value of the predetermined current threshold ranges from 30A to 120A.

In actual operation, this can be achieved by controlling the duty cycle of the PWM signal output by the module 61. In a specific implementation, the first rate of change of the rotational speed of the motor 43 corresponds to the first rate of change of the duty cycle of the PWM signal, and the second rate of change of the rotational speed of the motor 43 corresponds to the second rate of change of the duty cycle of the PWM signal. The second rate of change of the duty cycle is lower than the first rate of change of the duty cycle. Optionally, the ratio of the first rate of change of the duty cycle to the second rate of change of the duty cycle is greater than or equal to 2.

When the rotational speed of the power tool 40 changes at the first rate of change, the duty cycle of the PWM signal is gradually increased to the duty cycle corresponding to the predetermined rotational speed at the first rate of change of the duty cycle, so as to start normally.

When the rotational speed of the power tool 40 changes at the second rate of change lower than the first rate of change, the duty cycle of the PWM signal is gradually increased to the duty cycle corresponding to the predetermined rotational speed at the second rate of change of the duty cycle lower than the first rate of change of the duty cycle, so as to start under low temperature.

Figure 24:
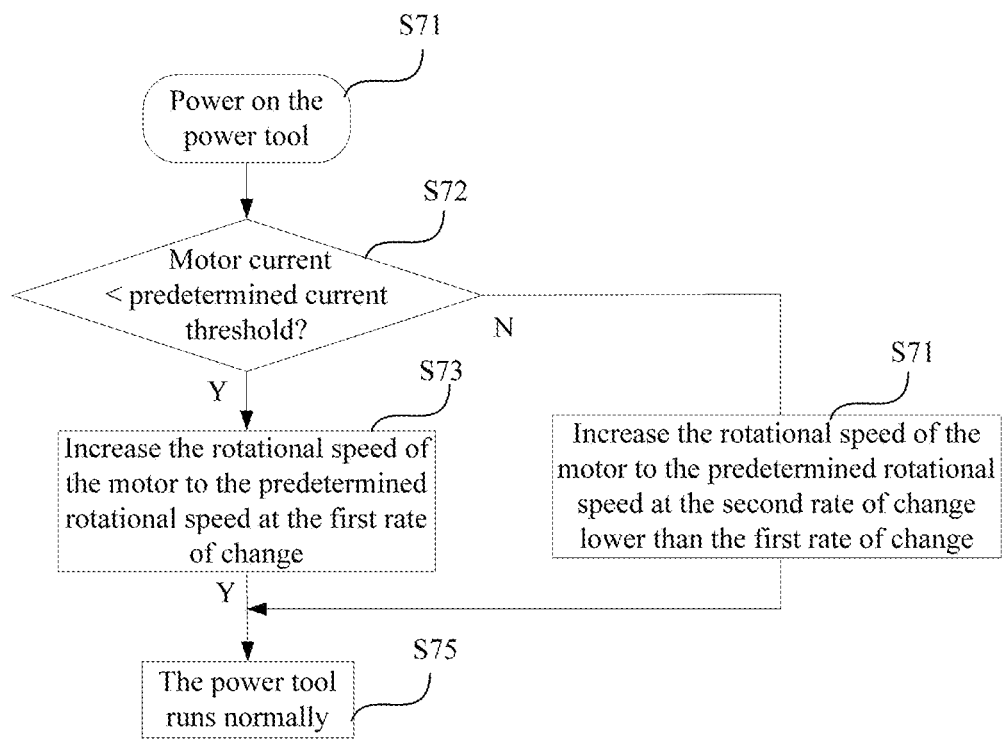
FIG. 24 is a flowchart of the method for starting the power tool shown in FIG. 23.

Referring to FIG. 24, in an example, the method for starting the power tool 40 includes:

Step S71: power on the power tool;

Step S72: obtain the current of the motor and determine whether the current of the motor is lower than the predetermined current threshold, if yes, go to step S73, otherwise go to step S74;

Step S73: in a normal starting mode, gradually increase the rotational speed of the motor 43 to the predetermined rotational speed at the first rate of change; the predetermined rotational speed is the speed at which the power tool 40 works normally.

Step S74: in a low temperature starting mode, gradually increase the rotational speed of the motor 43 to the predetermined rotational speed at the second rate of change lower than the first rate of change.

Step S75: the power tool 40 has started, that is, the motor 43 runs at the final rotational speed, and the power tool 40 works normally.

The aforementioned example can ensure the normal and safe startup of the power tool 40 under low temperature conditions. Setting the current detection circuit 712 to detect the current of the power tool 40 enables the timely recognition of low environment temperature of the power tool 40. This is because when the motor is started in a low temperature environment, the starting torque is increased due to the solidification of the lubricating oil of the transmission device 44. At this time, if the starting torque is forced to start according to the normal starting mode, the starting current is also larger. Therefore, detecting the current of the motor 43 also enables the timely recognition of low environment temperature of the power tool 40. When the current of the motor is detected to be higher than the predetermined threshold current, reduce the rate of change of the starting speed of the motor 43, thereby reducing the starting current of the motor 43, and avoiding the problem of increased starting torque at low temperature and increased starting current, which causes the drive switch to be damaged or the power tool 40 to enter the overcurrent protection and start unsuccessfully.

Figure 25:
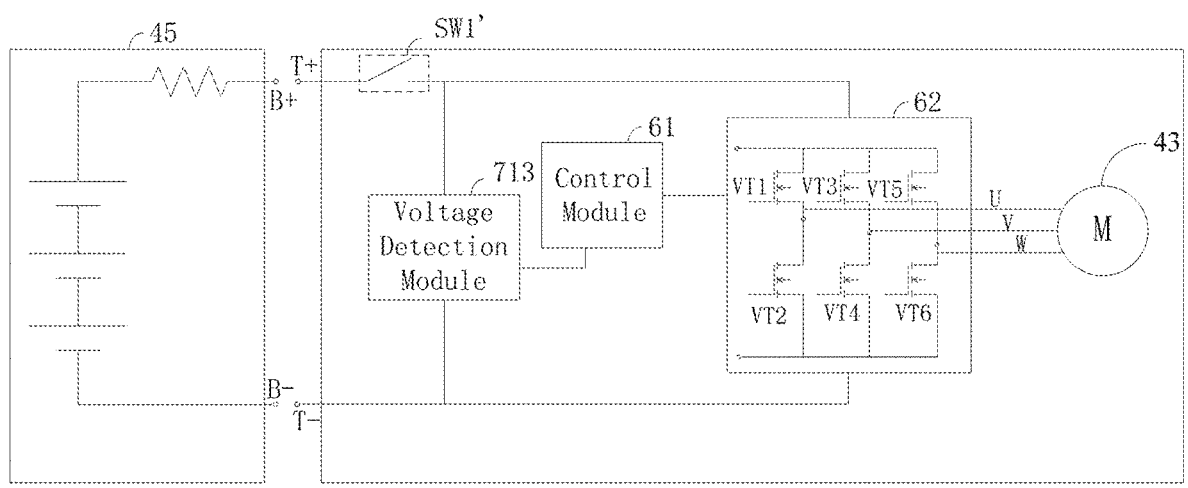
FIG. 25 is a simplified diagram of an example of the circuitry of the power tool shown in FIG. 12.

Referring to FIG. 25, the detection module 71 of the power tool 40 includes a voltage detection module 713, for detecting the output voltage of the battery pack 45, which is electrically connected to the control module 61, for transmitting the detected results to the control module 61. Optionally, the voltage detection module 713 includes detection resistors and the like.

In the present example, the control module 61 is configured to: obtain the output voltage of the battery pack 45; dynamically adjust the duty cycle of the PWM signal output to the drive circuit 62 according to the output voltage of the battery pack 45 so that the output voltage of the battery pack 45 is greater than the first undervoltage protection threshold.

Optionally, when the temperature of the power tool 40 is lower than a predetermined temperature threshold, set up a first undervoltage protection threshold; when the temperature of the power tool 40 is higher than the predetermined temperature threshold, set up a second undervoltage protection threshold; wherein, the first undervoltage protection threshold is less than the second undervoltage protection threshold. Optionally, the value of the predetermined temperature threshold ranges from −20° C. to 10° C.

In some examples, the ratio of the first undervoltage protection threshold to the rated voltage of the battery pack 45 ranges from 0.25 to 0.75. In some examples, the ratio of the second undervoltage protection threshold to the rated voltage of the battery pack 45 ranges from 0.3 to 0.8. For example, taking a battery pack 45 with a rated voltage of 48V as an example, the first undervoltage protection threshold is, for example, 24V, and the second undervoltage protection threshold is 30V.

In other words, different undervoltage protection thresholds are set according to the temperature of the power tool 40. The undervoltage protection threshold at low temperature is less than the undervoltage protection threshold at normal temperature.

The control module 61 is further configured to: if the output voltage of the battery pack is less than the predetermined voltage threshold, reduce the duty cycle of the PWM signal output to the drive circuit so that the output voltage of the battery pack is greater than or equal to the predetermined voltage threshold.

The method that the control module 61 dynamically adjusts the duty cycle of the PWM signal output to the drive circuit 62 according to the output voltage of the battery pack 45 includes: if the output voltage of the battery pack 45 is less than a predetermined threshold voltage, reduce the duty cycle of the PWM signal output to the drive circuit so that the output voltage of the battery pack 45 is greater than or equal to the predetermined voltage threshold. Wherein, the predetermined voltage threshold is greater than the first undervoltage protection threshold and less than the second undervoltage protection threshold. For example, taking a battery pack 45 with a rated voltage of 48V as an example, the first undervoltage protection threshold is 24V, for example, and the second undervoltage protection threshold is 30V, then the predetermined voltage threshold is set between 24V and 30V, for example 27V.

Since the predetermined voltage threshold is set between the undervoltage protection threshold of normal temperature and the undervoltage protection threshold of low temperature, under normal temperature, when the output voltage of the battery pack 45 drops to the second undervoltage protection threshold, the power tool 40 enters the undervoltage protection and shuts down, which will not reach the lower first undervoltage protection threshold and trigger a low-temperature startup. When the output voltage of the battery pack 45 drops to the first undervoltage protection threshold, the low-temperature startup starts.

In the low temperature startup, the control module 61 is configured to: if the output voltage of the battery pack 45 is less than the predetermined voltage threshold, reduce the duty cycle of the PWM signal output to the drive circuit 62 such that the output voltage of the battery pack 45 is greater than or equal to the predetermined voltage threshold.

That is, when the voltage of the battery pack 45 has dropped to reach the predetermined voltage threshold, and about to reach the undervoltage protection threshold at low temperature (i.e., the first undervoltage protection threshold), the control module 61 reduces the duty cycle of the PWM signal output to the drive circuit 62, in such a way as to reduce the output current of the battery pack 45 to the motor 43, and due to the internal resistance of the battery pack 45, the output voltage of the battery pack 45 increases, so that the voltage of the power tool 40 rises, so as to avoid the situation that the power tool 40 enters the undervoltage protection at low temperature and shuts down, causing unsuccessfully startup.

In the initial stage of startup, the temperature of the power tool 40 is low, the lubricating oil is in a solidified state, and the starting torque of the motor 43 is relatively large. When starting, the output voltage of the battery pack 45 rises briefly and then drops below the predetermined voltage threshold. Once detecting that the output voltage of the battery pack 45 drops below the predetermined voltage threshold, the control module 61 reduces the duty cycle of the PWM signal output to the drive circuit 62.

If the output voltage of the battery pack 45 is determined to be greater than the predetermined voltage threshold, then gradually increase the duty cycle of the PWM signal, for example, each time increase the duty cycle of the PWM signal by a predetermined duty cycle increment and stop increasing once the duty cycle of the PWM signal reaches the final duty cycle. After that, the motor 43 enters the normal operation stage with the final duty cycle, and the motor 43 has started. In other words, if the output voltage of the battery pack 45 is greater than the predetermined voltage threshold, determine whether the current duty cycle is equal to the final duty cycle; if the current duty cycle is equal to the final duty cycle, then output the final duty cycle of the PWM signal to control the drive circuit 62 to make the motor 43 run normally. Optionally, the final duty cycle is set to 100%. Of course, the final duty cycle can also be another predetermined duty cycle to ensure that the motor can run normally.

And in the whole process, the output voltage of the battery pack 45 needs to be monitored in real time to determine whether the duty cycle of the PWM signal needs to be reduced. Once the output voltage of the battery pack 45 is detected to drop below the predetermined voltage threshold, the control module 61 reduces the duty cycle of the PWM signal output to the drive circuit 62.

Figure 26:
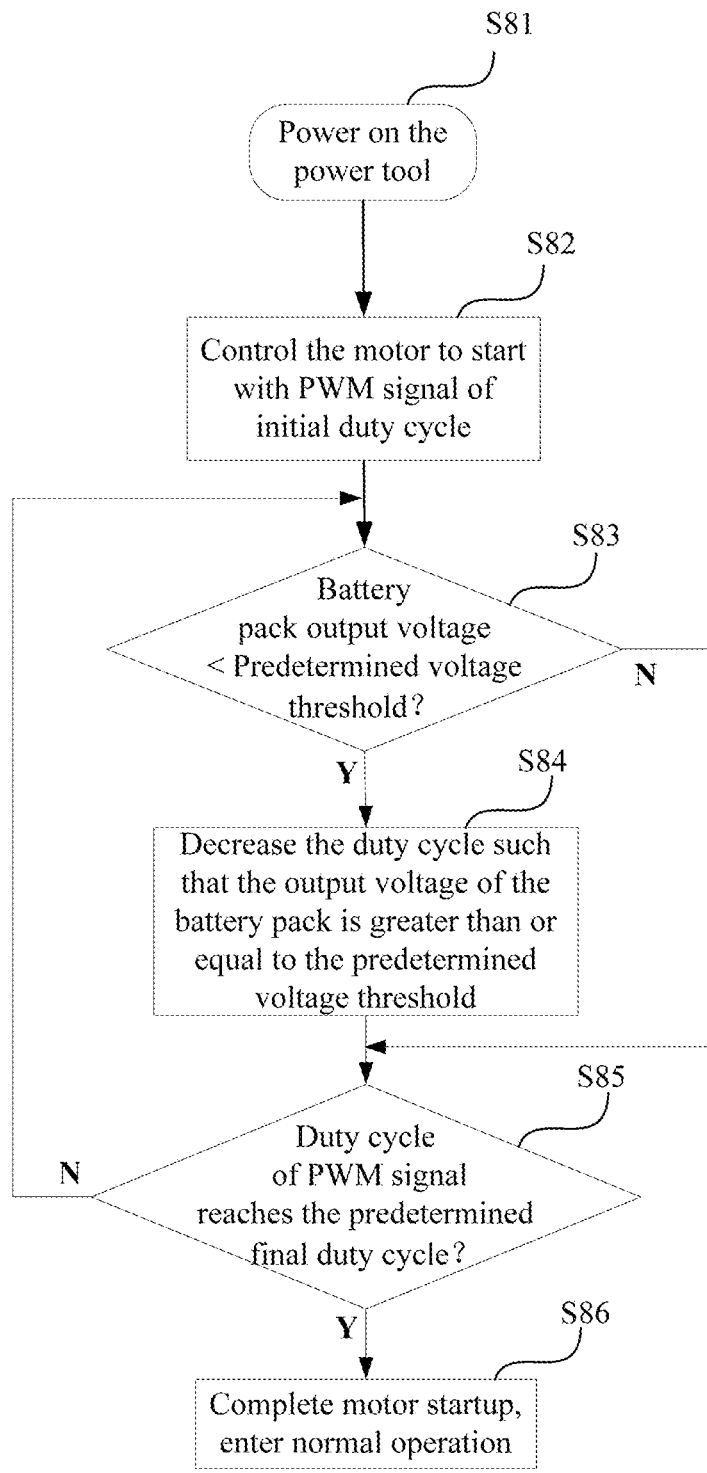
FIG. 26 is a flowchart of the method for starting the power tool shown in FIG. 25.

Referring to FIG. 26, the method for starting the power tool 40 shown in FIG. 2 includes:

Step S81: power on the power tool 40;

The power tool 40 is powered on, the control module 61 is powered on, and the motor 43 is ready to start.

Step S82: control the drive circuit 62 with the PWM signal of an initial duty cycle;

In a specific implementation, the control module 611 first outputs the initial duty cycle to the drive circuit 62 to start the motor. The initial duty cycle is less than the final duty cycle. Optionally, the ratio of the initial duty cycle to the final duty cycle ranges from 5% to 20%, for example, the initial duty cycle is 10%, and the final duty cycle is generally set to 100%.

Step S83: determine whether the output voltage of the battery pack 45 is less than the predetermined voltage threshold, if yes, go to step S84; if not, go to step S85.

In a specific implementation, the control module 61 obtains the output voltage of the battery pack 45 detected by the voltage detection module 713 and determines whether the output voltage of the battery pack 45 is less than the predetermined voltage threshold, if yes, go to step S14; if not, go to step S15.

Step S84: decrease the duty cycle such that the output voltage of the battery pack 45 is greater than or equal to the predetermined voltage threshold.

In a specific implementation, if the output voltage of the battery pack 45 is less than the predetermined voltage threshold, the control module 61 reduces the duty cycle of the PWM signal output to the drive circuit 62 such that the output voltage of the battery pack 45 is greater than or equal to the predetermined voltage threshold; the predetermined voltage threshold is greater than the first undervoltage protection threshold and less than the second undervoltage protection threshold.

Wherein the first undervoltage protection threshold and the second undervoltage protection threshold are set as follows: if the temperature of the power tool 40 is lower than the predetermined temperature threshold, the undervoltage protection threshold of the power tool 40 is set to the first undervoltage protection threshold; if the temperature of the power tool 40 is higher than the predetermined temperature threshold, the undervoltage protection threshold of the power tool 40 is set to the second undervoltage protection threshold; wherein the first undervoltage protection threshold is less than the second undervoltage protection threshold.

Optionally, the value of the predetermined temperature threshold ranges from −20° C. to 10° C.

Optionally, the ratio of the first undervoltage protection threshold to the rated voltage of the battery pack 45 ranges from 0.25 to 0.75.

Optionally, the ratio of the second undervoltage protection threshold to the rated voltage of the battery pack 45 ranges from 0.3 to 0.8.

That is, the predetermined voltage threshold is greater than the undervoltage protection threshold of the power tool 40 at low temperature, and less than the undervoltage protection threshold of the power tool 40 at normal temperature. For example, taking a battery pack 45 with a rated voltage of 48V as an example, the first undervoltage protection threshold is 24A, the second undervoltage protection threshold is 30A, and the predetermined voltage threshold is 27A.

Step S85: determine whether the duty cycle of the PWM signal reaches the predetermined final duty cycle, if yes, go to step S86; if not, go to step S83.

The control module 61 determines whether the duty cycle of the PWM signal output to the drive circuit 62 reaches the predetermined final duty cycle, if yes, then go to step S86, the motor 43 has started, the motor 43 enters normal operation, and the control module 61 controls the motor 43 to enter the normal operation phase at a speed corresponding to the final duty cycle. Optionally, the final duty cycle is set to 100%. Of course, the final duty cycle can also be another predetermined duty cycle.

Step S86: the motor 43 has started.

The power tool 40 completes the startup process and enters the normal operation stage.

Figure 27:
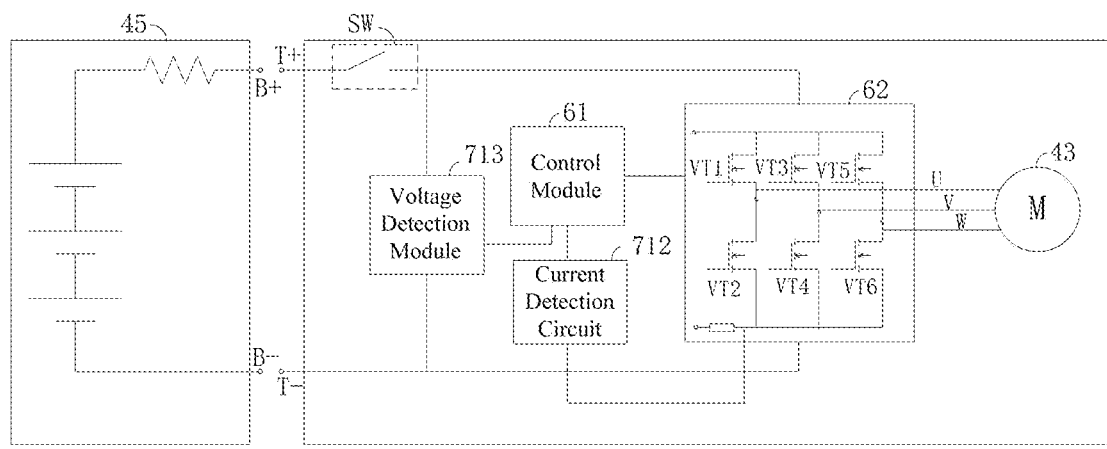
FIG. 27 is a simplified diagram of an example of the circuitry of the power tool shown in FIG. 12.

Referring to FIG. 27, a simplified diagram of a circuitry of the power tool 40 according to another example, the difference between the present example and the previous example is the addition of a current detection circuit 712 and a current detection module 713 for detecting the current of the motor 43. In some examples, the current detection circuit 712 is configured to detect the bus current or phase current of the motor 43. The current detection circuit 712 is electrically connected to the control module 61.

In the present example, as compared with the preceding examples, the duty cycle of the PWM signal output to the drive circuit 62 is dynamically adjusted according to the output voltage of the battery pack 45 so that the output voltage of the battery pack 45 is greater than the first undervoltage protection threshold. The specific implementation is the same as or similar to the foregoing implementation and will not be repeated here. The difference is that, in the present example, the control module 61 is configured to: before determining whether the output voltage of the battery pack 45 is less than the predetermined voltage threshold, it needs to: obtain the current of the motor 43; determine whether the current of the motor 43 is less than a predetermined current threshold: when the current of the motor 43 is less than the predetermined current threshold, output a first PWM signal with a gradually increasing duty cycle to the drive circuit 62 so that the rotational speed of the motor 43 gradually increases to the predetermined rotational speed at the first rate of change; when the current of the motor 43 is greater than or equal to the predetermined current threshold, output a second PWM signal with a gradually increasing duty cycle to the drive circuit so that the rotational speed of the motor gradually increases to the predetermined rotational speed at the second rate of change; the increasing rate of the duty cycle of the second PWM signal is less than the increasing rate of the duty cycle of the first PWM signal.

That is, in the initial stage of starting the motor 43, when the current of the motor 43 is small, the duty cycle increases at a faster rate, and when the current of the motor 43 is large, the duty cycle increases at a slower rate, thereby starting slowly when the current of the motor 43 is large, and starting quickly when the current of the motor 43 is small, so as to prevent the motor 43 from a large starting current exceeding the overcurrent protection threshold, which causes unsuccessful startup of the motor 43, while at the same time prevent the battery pack 45 from a large starting current, which causes undervoltage protection and startup failure of the motor.

Optionally, the value of the predetermined current threshold ranges from 50A to 100A. The predetermined current threshold is set to prevent excessive starting current, which causes overcurrent protection and startup failure. The present application uses the predetermined current threshold as a reference and starts to decrease the duty cycle after the current of the motor 43 reaches the predetermined current threshold, so that the current of the motor 43 will not exceed the current of the overcurrent protection. The current value of the overcurrent protection is greater than the predetermined current threshold. Optionally, the current value of the overcurrent protection ranges from 110A to 130A.

Optionally, the increase rate of the duty cycle of the second PWM signal is in a negative correlation with the current of the motor 43. That is, the rate at which the duty cycle of the second PWM signal increases is related to the current of the motor 43. The larger the current of the motor 43, the lower the rate at which the duty cycle of the second PWM signal increases, that is, increases in a slower manner.

Optionally, the increase rate of at least one of the duty cycle of the first PWM signal and the duty cycle of the second PWM signal when it is less than the predetermined duty cycle is greater than the increase rate of the duty cycle of that PWM signal when it is greater or equal to the predetermined duty cycle.

For example, if the predetermined current threshold is set to 80A, when the current of the motor 43 is less than 80A, at least one of the duty cycle of the first PWM signal and the duty cycle of the second PWM signal is controlled to increase at a rate of 1% every 3 ms within the range of 0-50%, and increase at a rate of 2% every 3 ms within the range of 50%-100%. When the motor 43 current is greater than or equal to 80A, the increase rate is changed according to the magnitude of the current, for example: when the value of the bus current is between 80A and 90A, the duty cycle is controlled to increase at a rate of 0.1% every 3 ms within the range of 0-50%, and increase at a rate of 0.2% every 3 ms within the range of 50%-100%.

With the above configuration, the motor 43 adjusts the duty cycle of the PWM signal according to the current of the motor 43 in the initial stage of starting, so that the current of the motor 43 will not become too large and enter the overcurrent protection.

Figure 28:
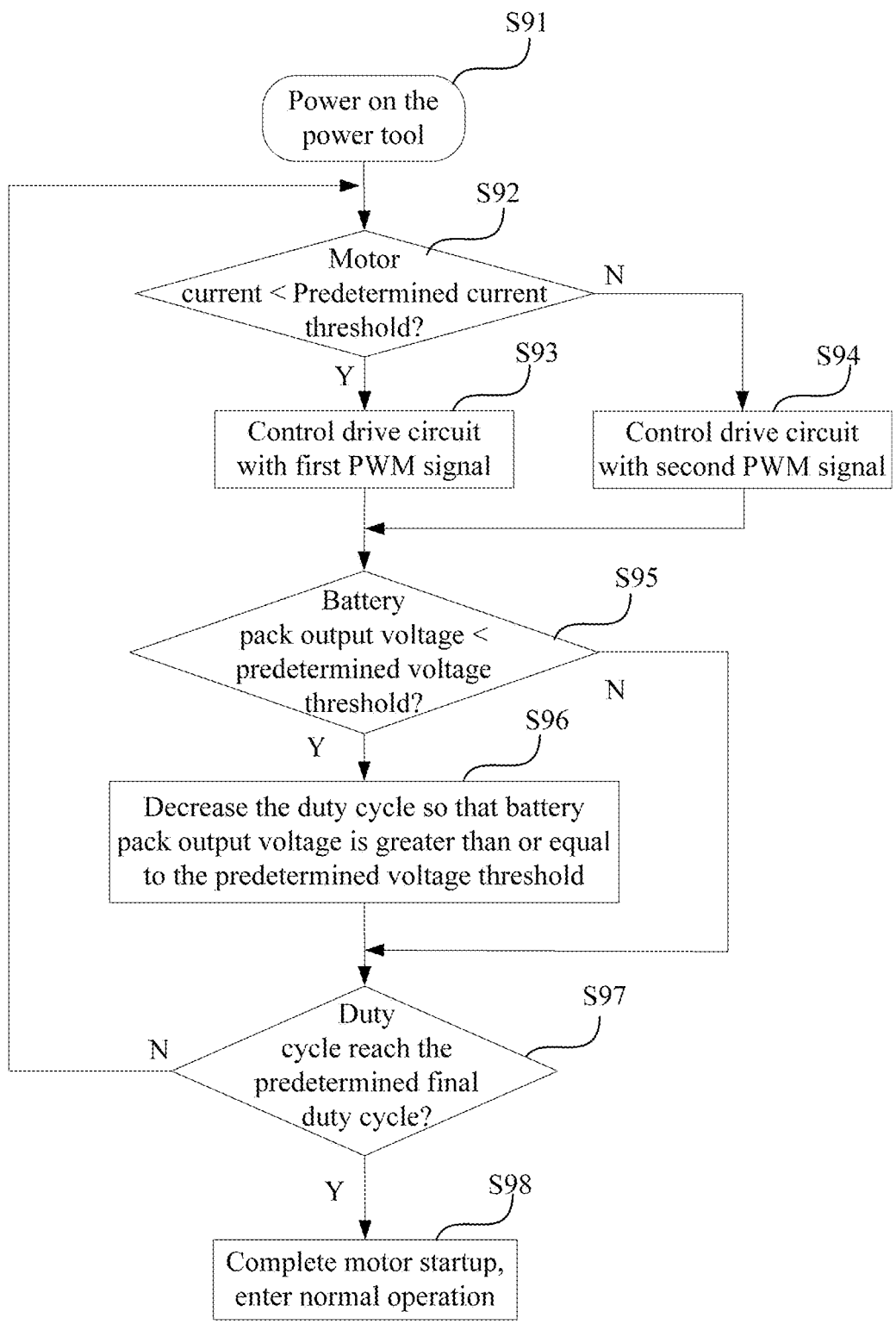
FIG. 28 is a flowchart of the method for starting the power tool shown in FIG. 27.

Referring to FIG. 28, in an example, the method for starting the power tool 40 includes:

Step S91: start the motor 43;

Power on the power tool 40, and the control module 61 first controls the drive circuit 62 with the PWM signal of the initial duty cycle to start the motor 43.

Step S92: determine whether the current of the motor 43 is less than the predetermined current threshold, if yes, go to step S93; if not, go to step S94.

In a specific implementation, the control module 61 obtains the detected current of the motor 43 from the current detection module 713 and determines whether the current of the motor 43 is less than the predetermined current threshold.

Step S93: control the drive circuit 62 with the first PWM signal;

In a specific implementation, when the current of the motor 43 is less than the predetermined current threshold, the control module 61 outputs the first PWM signal with a gradually increasing duty cycle to the drive circuit 62 to increase the rotational speed of the motor 43 at the first rate of change.

Step S94: control the drive circuit 62 with the second PWM signal;

In a specific implementation, when the current of the motor 43 is greater than or equal to the predetermined current threshold, the control module 61 outputs the second PWM signal with a gradually increasing duty cycle to the drive circuit 62 such that the rotational speed of the motor 43 increases at the second rate of change that is less than the first rate of change; wherein the increase rate of the duty cycle of the second PWM signal is less than the increase rate of the duty cycle of the first PWM signal.

In other words, if the current of the motor 43 is small, then start in the normal soft-start process, wherein the duty cycle increases in a normal increase rate. If the current of the motor 43 is large, i.e., greater than the predetermined current threshold, then reduce the increase rate of the duty cycle to make the motor 43 start slower than normal so as to avoid a large current, which causes overcurrent protection and startup failure of the motor 43.

Optionally, the increase rate of the duty cycle of the second PWM signal is in a negative correlation with the current of the motor 43. That is, the rate at which the duty cycle of the second PWM signal increases is related to the current of the motor 43. The larger the current of the motor 43, the lower the rate at which the duty cycle of the second PWM signal increases, that is, increases in a slower manner.

Optionally, the increase rate of at least one of the duty cycle of the first PWM signal and the duty cycle of the second PWM signal when it is less than the predetermined duty cycle is greater than the increase rate of the duty cycle of that PWM signal when it is greater or equal to the predetermined duty cycle.

For example, if the predetermined current threshold is set to 80A, when the current of the motor 43 is less than 80A, at least one of the duty cycle of the first PWM signal and the duty cycle of the second PWM signal is controlled to increase at a rate of 1% every 3 ms within the range of 0-50%, and increase at a rate of 2% every 3 ms within the range of 50%-100%. When the motor 43 current is greater than or equal to 80A, the increase rate is changed according to the magnitude of the current, for example: when the value of the bus current is between 80A and 90A, the duty cycle is controlled to increase at a rate of 0.1% every 3 ms within the range of 0-50%, and increase at a rate of 0.2% every 3 ms within the range of 50%-100%.

Step S95: determine whether the output voltage of the battery pack 45 is less than the predetermined voltage threshold, if yes, go to step S96; if not, go to step S97.

In a specific implementation, the control module 61 obtains the output voltage of the battery pack 45 detected by the voltage detection module 713 and determines whether the output voltage of the battery pack 45 is less than the predetermined voltage threshold, if yes, go to step S96; if not, go to step S97.

Step S96: decrease the duty cycle so that the output voltage of the battery pack is greater than or equal to the predetermined voltage threshold.

In a specific implementation, if the output voltage of the battery pack 45 is less than the predetermined voltage threshold, the duty cycle of the PWM signal output to the drive circuit 62 is reduced to make the output voltage of the battery pack 45 greater than or equal to the predetermined voltage threshold; the predetermined voltage threshold is set to be greater than the first undervoltage protection threshold and less than the second undervoltage protection threshold.

Wherein the first undervoltage protection threshold and the second undervoltage protection threshold are set as follows: if the temperature of the power tool 40 is higher than the predetermined temperature threshold, the undervoltage protection threshold of the power tool 40 is set to the second undervoltage protection threshold; if the temperature of the power tool 40 is lower than the predetermined temperature threshold, the undervoltage protection threshold of the power tool 40 is set to the first undervoltage protection threshold; wherein the first undervoltage protection threshold is less than the second undervoltage protection threshold.

Optionally, the value of the predetermined temperature threshold ranges from −20° C. to 10° C.

Optionally, the ratio of the first undervoltage protection threshold to the rated voltage of the battery pack 45 ranges from 0.25 to 0.75.

Optionally, the ratio of the second undervoltage protection threshold to the rated voltage of the battery pack 45 ranges from 0.3 to 0.8.

That is, the predetermined voltage threshold is greater than the undervoltage protection threshold of the power tool 40 at low temperature and less than the undervoltage protection threshold of the power tool 40 at normal temperature. For example, taking a battery pack 45 with a rated voltage of 48V as an example, the first undervoltage protection threshold is, for example, 24A, and the second undervoltage protection threshold is, for example, 30A, and the predetermined voltage threshold can be set to 27A.

Step S97: determine whether the duty cycle has reached the predetermined final duty cycle, if yes, go to step S67; if not, go to step S62.

The control module 61 determines whether the duty cycle of the PWM signal output to the drive circuit 62 has reached the predetermined final duty cycle. If so, the motor has started and enters the normal operation stage. The control module 61 controls the motor 43 to enter the normal operation stage at the final rotational speed corresponding to the final duty cycle. Optionally, the final duty cycle is set to 100%. Of course, the final duty cycle can also be another predetermined duty cycle.

Step S98: the motor 43 has started and enters the normal operation stage.

The power tool 40 completes the startup process and enters the normal operation stage.

Figure 29:
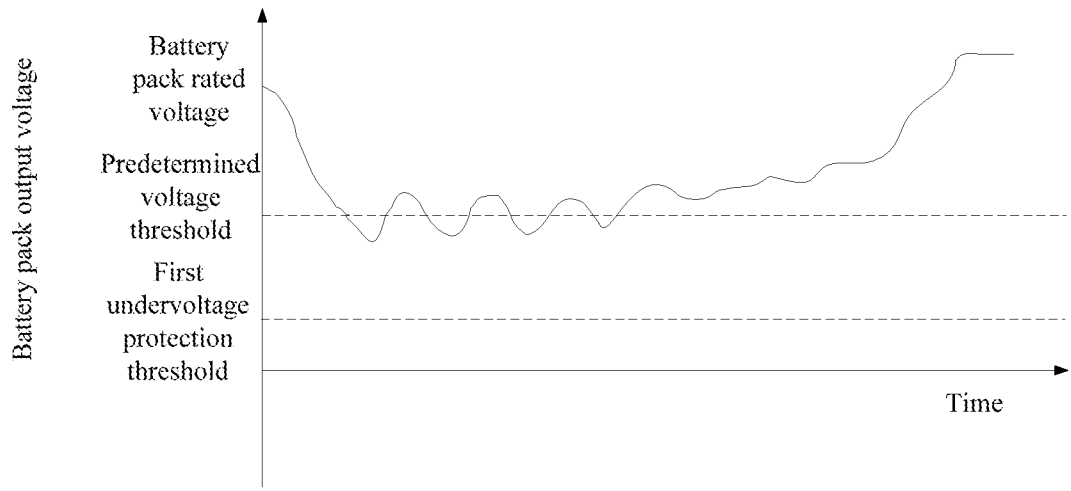
FIG. 29 is a schematic diagram of the change of the output voltage of a battery pack when using the method for starting the power tool shown in FIGS. 26 and 28.
Figure 33:
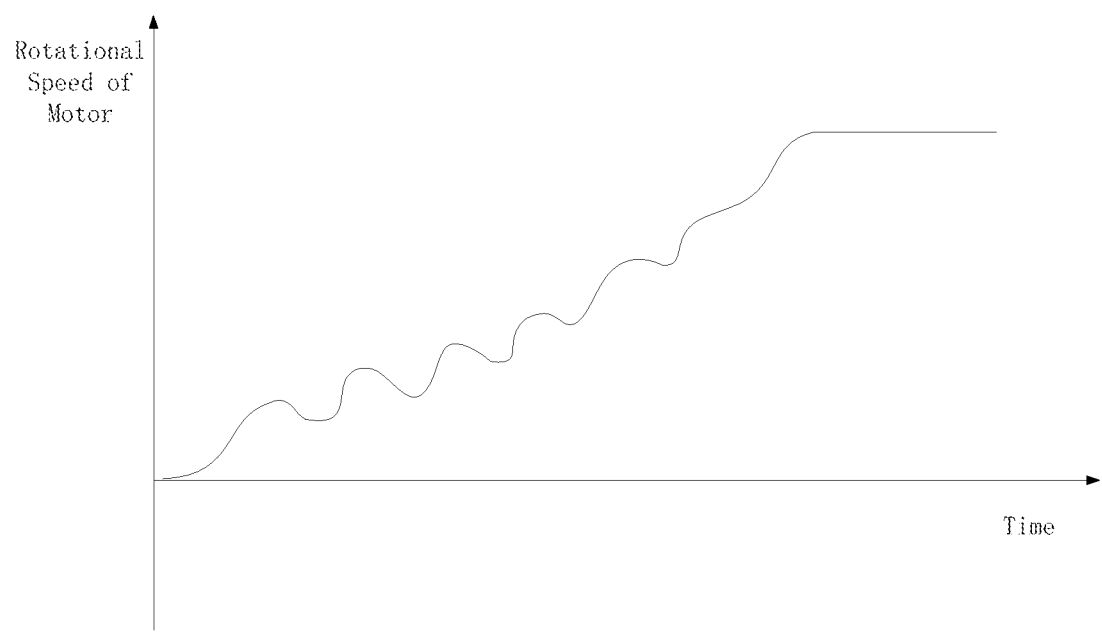
FIG. 33 is a schematic diagram of the change of the rotational speed of the motor over time when using the method for starting the power tool shown in FIGS. 26, 28 and 31.

Referring to FIG. 29, the above two examples dynamically adjust the duty cycle output to the drive circuit 62 according to the output voltage of the battery pack 45. The output voltage of the battery pack 45 fluctuates around the predetermined voltage threshold within a predetermined time range, and within the predetermined time range, the rotational speed of the motor 43 changes repeatedly, and each repeated change of the rotational speed of the motor 43 includes a rise and a drop and then another rise of the rotational speed. In other words, with the above method, the rotational speed of the motor can repeatedly rise and drop;

and the motor can start over and over again (FIG. 33), thereby accelerating the melting of the lubricating oil and ensuring the successful startup of the motor at low temperatures, also at a faster speed.

It should be noted that, the low-temperature startup process of the motor 43 of the present application is a process of adjusting the duty cycle so that in the early stage after the output voltage of the battery pack 45 has fallen to the predetermined voltage threshold, the output voltage of the battery pack 45 fluctuates around the predetermined voltage threshold, that is, basically stays around the predetermined voltage threshold, so as not to enter undervoltage protection. In the later stage of the startup process, due to the effect of repeated startup, the lubricating oil gradually melts and the starting torque decreases, the duty cycle of the PWM signal gradually increases to the final duty cycle, after which the motor 43 runs with the final duty cycle and enters the normal operation stage, and the motor 43 startup completes.

Figure 30:
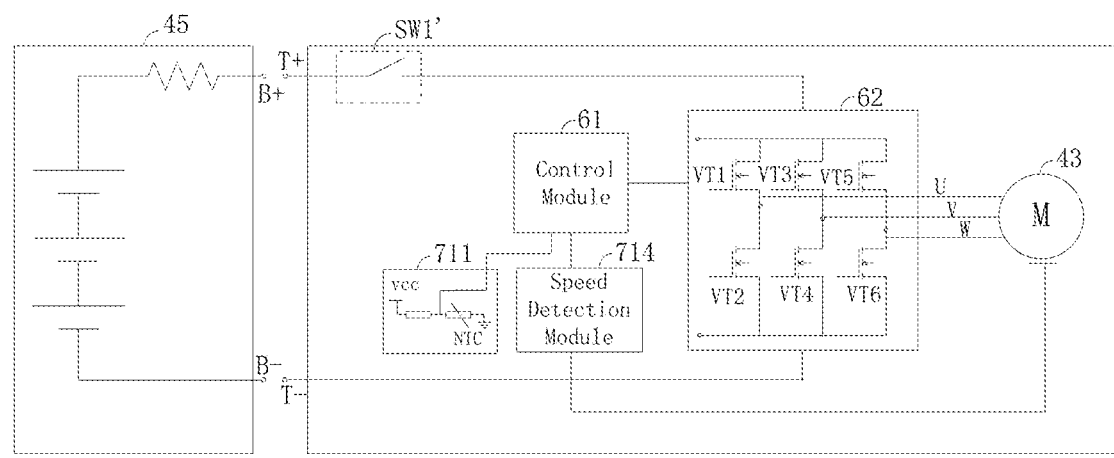
FIG. 30 is a simplified diagram of an example of the circuitry of the power tool shown in FIG. 12.

Referring to FIG. 30, according to an example of the simplified diagram of the circuitry of the power tool 40, the detection module of the power tool 40 includes a temperature sensor 711 and a speed detection module 714.

The temperature sensor 711 is configured to detect the temperature of the power tool 40. Optionally, the temperature sensor 711 is provided inside the power tool 40. As an optional solution, the temperature sensor 711 may be a thermistor, especially an NTC thermistor. The temperature sensor 711 is electrically connected to the control module 61.

The speed detection module 714 is configured to detect the rotational speed of the motor 43. The speed detection module 714 may include some sensors, such as Hall sensors arranged near the rotor inside the motor 43, a photoelectric encoder, and a magnetic encoder, etc. Of course, the speed detection module 714 may also calculate the rotational speed by detecting the phase current or the bus current of the motor.

In the present application, the control module 61 is configured to output a control signal to the drive circuit 62 such that the rotational speed of the motor 43 changes repeatedly; wherein each repeated change of the rotational speed of the motor 43 includes a rise and a drop and then another rise of the rotational speed.

As an optional solution, the control signal is a PWM signal; the control module 61 is configured to: obtain the rotational speed of the motor 43; dynamically adjust the duty cycle of the PWM signal output to the drive circuit 62 according to the rotational speed of the motor 43, so that the rotational speed of the motor 43 is greater than or equal to the predetermined rotational speed threshold corresponding to the duty cycle interval of the current duty cycle.

The power tool 40 has a plurality of predetermined rotational speed thresholds and a plurality of duty cycle intervals; the plurality of predetermined rotational speed thresholds and the plurality of duty cycle intervals are mapped in one-to-one correspondence. In some examples, when the duty cycle is in the first duty cycle interval, the predetermined rotational speed threshold is set to the first predetermined rotational speed threshold; when the duty cycle is in the second duty cycle interval, the predetermined rotational speed threshold is set to the second predetermined rotational speed threshold. A duty cycle in the first duty cycle interval is less than a duty cycle in the second duty cycle interval. The first predetermined rotational speed threshold is less than the second predetermined rotational speed threshold.

Figure 32:
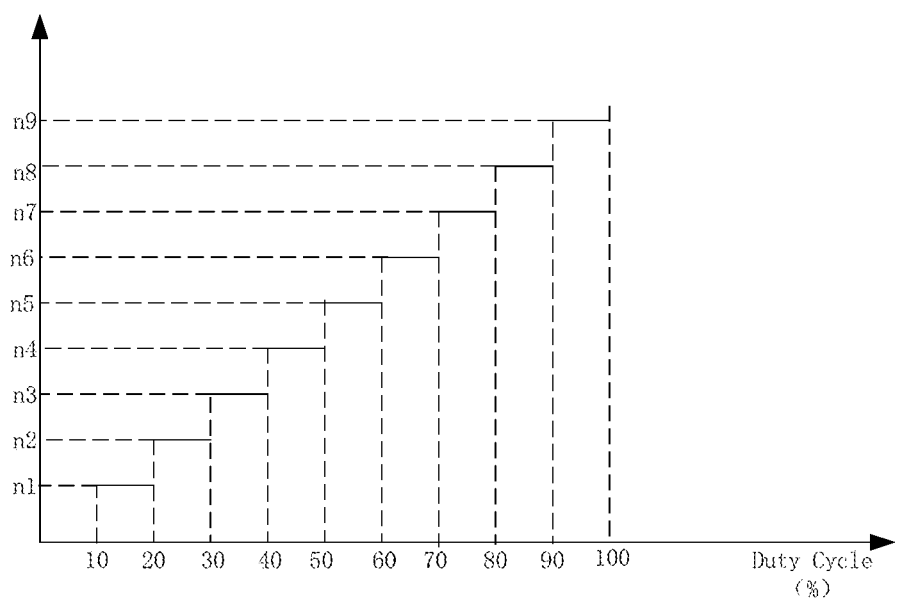
FIG. 32 depicts the predetermined rotational speed thresholds corresponding to each duty cycle interval in the method for starting the power tool shown in FIG. 31.

Referring to FIG. 32, for example, when the duty cycle of the PWM signal output by the control module 61 to the drive circuit 62 is in the interval of 10%-20%, the predetermined rotational speed threshold is set to n1; when the duty cycle of the PWM signal output by the control module 61 to the drive circuit 62 is in the interval of 20%-30%, the predetermined rotational speed threshold is set to n2; when the duty cycle of the PWM signal output by the control module 61 to the drive circuit 62 is in the interval of 30%-40%, the predetermined rotational speed threshold is set to n3, . . . , when the duty cycle of the PWM signal output by the control module 61 to the drive circuit 62 is in the interval of 90%-100%, the predetermined rotational speed threshold is set to n9. The predetermined rotational speed threshold corresponding to each duty cycle interval increases as the duty cycle corresponding to the duty cycle interval increases. For example, the values of the aforementioned predetermined rotational speed thresholds n1, n2, . . . , n9 increase in sequence. Each predetermined rotational speed threshold is set as the under speed protection threshold of the motor 43 corresponding to the duty cycle within the range of the duty cycle interval. When the rotational speed of the motor 43 is lower than the under speed protection threshold, the motor 43 has a tendency to stall.

Optionally, when the rotational speed of the motor 43 is less than the predetermined rotational speed threshold, the control module 61 reduces the duty cycle of the PWM signal to the predetermined duty cycle threshold. In an example, the value of the predetermined duty cycle threshold ranges from 5% to 15%. That is, when the rotational speed of the motor 43 has not reached the predetermined rotational speed threshold corresponding to the duty cycle interval, the duty cycle is reduced to ensure that the current of the motor 43 does not exceed the overcurrent protection threshold and start unsuccessfully. The predetermined duty cycle threshold is greater than or equal to an initial duty cycle output by the control module 61 to the drive circuit 62 when the motor begins to start, and the initial duty cycle is used to start the motor 43. In an example, the value of the initial duty cycle ranges from 5% to 10%.

In an example, after the duty cycle of the PWM signal is reduced to the predetermined duty cycle threshold, the control module 61 then increases the duty cycle of the PWM signal by a predetermined duty cycle increment. The power tool 40 may have a plurality of predetermined duty cycle increments, and the control module 61 gradually increases the duty cycle of the PWM signal by the plurality of predetermined duty cycle increments. Wherein, the predetermined duty cycle increment of this time is less than the predetermined duty cycle increment of the next time. In other words, every time the duty cycle decreases to the predetermined duty cycle threshold, the control module 61 increases the duty cycle of the PWM signal by different predetermined duty cycle increments. For example, after the duty cycle of the PWM signal decreases to the predetermined duty cycle threshold for a first time, the duty cycle increases by 20%; and after the duty cycle of the PWM signal decreases to the predetermined duty cycle threshold for a second time, the duty cycle is increased by 30%. The advantage is: when the rotational speed of the motor 43 has not reached the predetermined rotational speed threshold corresponding to the duty cycle interval, the duty cycle is decreased and then increased, resulting in the effect of repeated startup. During the process that the duty cycle is repeatedly increased, decreased and then increased again, the effect of repeated startup of the motor 43 is generated, and the starting torque is gradually reduced. Therefore, two PWM signals with the same duty cycle before and after can correspond to different rotational speeds of the motor 43 before and after, and the rotational speed of the latter one is greater than that of the earlier one.

After increasing in the duty cycle of the PWM signal each time, the control module 61 determines whether the rotational speed of the motor 43 is greater than the predetermined rotational speed threshold corresponding to the duty cycle interval of the current duty cycle; if the rotational speed of the motor 43 is greater than the predetermined rotational speed threshold, increase the duty cycle of the PWM signal by another predetermined duty cycle increment.

It should be noted that after increasing the duty cycle of the PWM signal by another predetermined duty cycle increment, the duty cycle of the PWM signal after the increase, i.e., the current duty cycle, may be increased to another duty cycle interval that is different from the aforementioned duty cycle interval. At this point, the current rotational speed of the motor must be compared with the predetermined rotational speed threshold corresponding to the duty cycle interval of the current duty cycle to determine whether to increase or decrease the duty cycle.

Through such a dynamic adjustment of the duty cycle, the duty cycle is repeatedly increased or decreased, so that the motor generate the effect of repeated startup impacts, so that the lubricating oil gradually melts, the starting torque is reduced, and the rotational speed is increased, so as to start the motor 43 successfully, and to ensure that the rotational speed of the motor 43 is not too low to stall, which leads to startup failure.

Before the control module 61 dynamically adjusts the duty cycle of the PWM signal output to the drive circuit 62 according to the rotational speed of the motor 43 such that the rotational speed of the motor is greater than or equal to the predetermined rotational speed threshold corresponding to the duty cycle interval of the current duty cycle, it is necessary to obtain the temperature of the power tool and determine whether the temperature of the power tool 40 is less than the predetermined temperature threshold.

Based on the temperature determination result, determine whether to dynamically adjust the duty cycle of the PWM signal output to the drive circuit 62 according to the rotational speed of the motor 43 such that the rotational speed of the motor is greater than or equal to the predetermined rotational speed threshold corresponding to the duty cycle interval of the current duty cycle. Optionally, the value of the predetermined temperature threshold ranges from −20° C. to 10° C.

If the temperature of the power tool 40 is less than the predetermined temperature threshold, it is determined that the power tool 40 is in a low temperature environment, and a low temperature start strategy needs to be adopted. The low temperature start strategy is to dynamically adjust the duty cycle of the PWM signal output to the drive circuit 62 according to the rotational speed of the motor 43 such that the rotational speed of the motor is greater than or equal to the predetermined rotational speed threshold corresponding to the duty cycle interval of the current duty cycle.

In an example, the temperature sensor is arranged in the power tool 40 near the drive switch of the drive circuit 62, so that it can also detect the temperature of the drive switch. The control module 61 is also configured to control the drive circuit 62 to stop driving the motor 43 when the detection result of the temperature sensor is higher than the second predetermined temperature threshold. The second predetermined temperature threshold is higher than the predetermined temperature threshold. Optionally, the value of the second predetermined temperature threshold ranges from 60° C. to 90° C.

Figure 31:
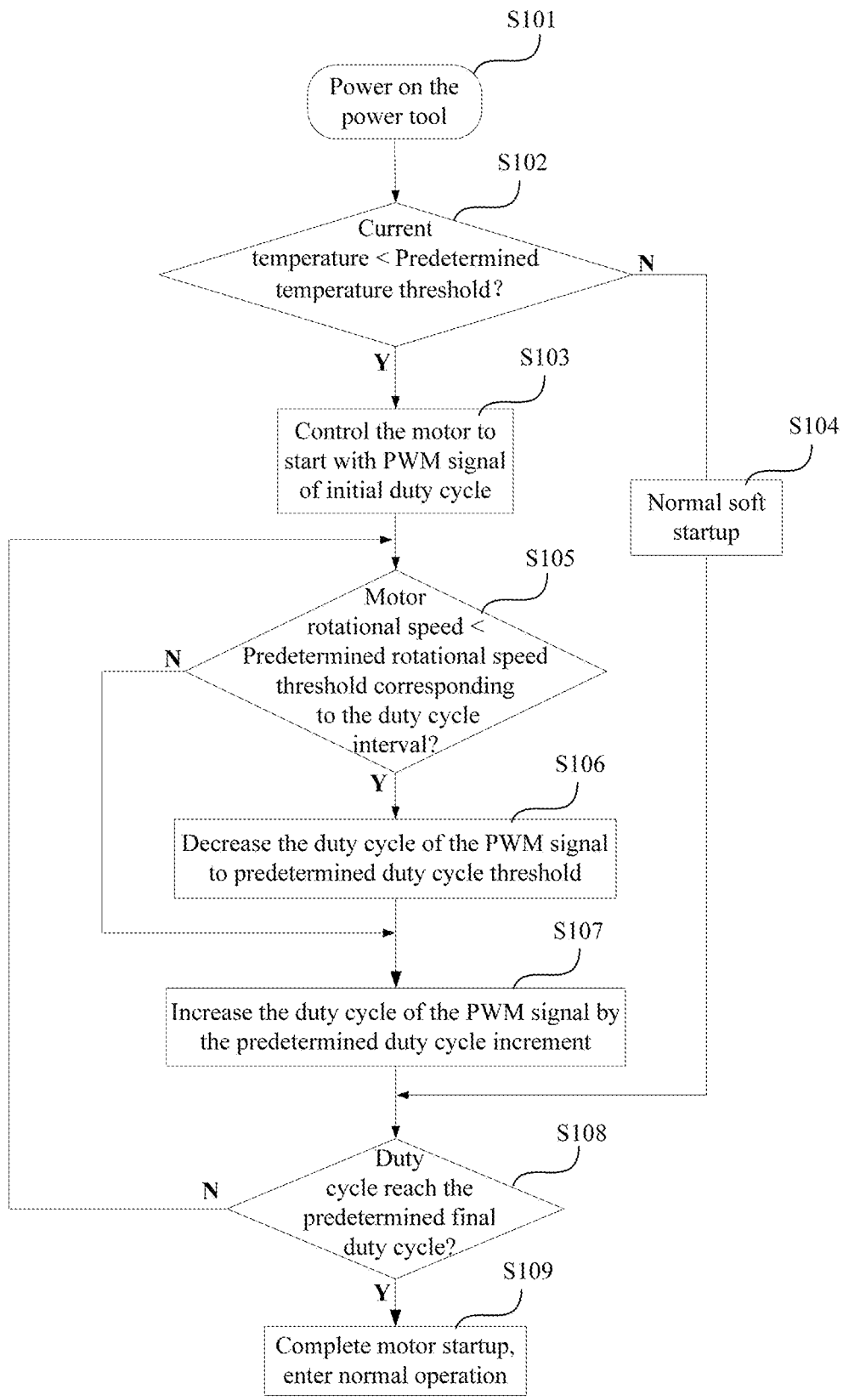
FIG. 31 is a flowchart of the method for starting the power tool shown in FIG. 30.

Referring to FIG. 31, in an example, the method for starting the power tool 40 includes:

Step S101: power on the power tool 40.

Step S102: determine whether the current temperature of the power tool 40 is lower than the predetermined temperature threshold, if yes, go to step S103; if not, go to step S104.

In a specific implementation, the control module 61 obtains the temperature detected by the temperature sensor 711 and determines whether the current temperature of the power tool 40 is lower than the predetermined temperature threshold, if yes, go to step S103; if not, go to step S104. Optionally, the value of the predetermined temperature threshold ranges from −20° C. to 10° C. If the current temperature is lower than the predetermined temperature threshold, it is determined that the power tool 40 is in a low temperature environment and needs to be started in a low temperature starting mode.

Step S103: control the motor 43 to start with the PWM signal of the initial duty cycle.

The power tool 40 enters the low-temperature startup process, and the control module 61 first outputs the PWM signal of the initial duty cycle to the motor 43 so that the motor 43 starts to rotate at a low speed. The value of the initial duty cycle ranges from 5% to 15%. For example, the initial duty cycle is 10%.

Step S104: soft-start the power tool 40 normally.

If the current temperature of the power tool 40 is greater than or equal to the predetermined temperature threshold, the power tool 40 starts in a normal soft-start mode. In other words, the duty cycle of the PWM signal output from the control module 61 to the drive circuit 62 gradually increases until the final duty cycle is reached, and then the motor runs normally. The normal soft-start method is a common method used in the art and will not be repeated here.

Step S105: determine whether the rotational speed of the motor 43 is less than the predetermined rotational speed threshold corresponding to the duty cycle interval, if yes, go to step S106; if not, go to step S107.

The predetermined rotational speed threshold is set in correspondence to the interval range of the duty cycle of the PWM signal output by the control module 61 to the drive circuit 62. The power tool 40 has a plurality of predetermined rotational speed thresholds and a plurality of duty cycle intervals; the plurality of predetermined rotational speed thresholds and the plurality of duty cycle intervals are mapped in one-to-one correspondence.

Step S106: decrease the duty cycle of the PWM signal to the predetermined duty cycle threshold.

When the rotational speed of the motor 43 is less than the predetermined rotational speed threshold, the control module 61 reduces the duty cycle of the PWM signal output to the drive circuit 62 to the predetermined duty cycle threshold. In an example, the value of the predetermined duty cycle threshold ranges from 5% to 15%.

Step S107: increase the duty cycle of the PWM signal by the predetermined duty cycle increment.

The control module 61 increases the duty cycle of the PWM signal output to the drive circuit 62 by the predetermined duty cycle increment. In an example, the predetermined duty cycle increment gradually increases, that is, the predetermined duty cycle increment of this time is less than the predetermined duty cycle increment of the next time.

Step S108: determine whether the duty cycle of the PWM signal has reached the predetermined final duty cycle, if yes, go to step S109; if not, go to step S105.

The control module 61 determines whether the current duty cycle of the PWM signal has reached the predetermined final duty cycle, if yes, then go to step S109; if not, go to step S105. Optionally, the predetermined final duty cycle is 100%. Of course, the predetermined final duty cycle may also be other values.

Step S109: the motor completes the startup process and enters normal operation.

When the duty cycle of the PWM signal reaches the predetermined final duty cycle, the control module 61 controls the motor 43 to run with the predetermined final duty cycle, the motor 43 completes the startup process and enters the normal operation stage.

In this example, the duty cycle is increased and the current (after-increase) rotational speed of the motor is compared with the current (after-increase) predetermined rotational speed threshold corresponding to the duty cycle interval to determine whether to further increase the duty cycle or directly decrease the duty cycle to the predetermined duty cycle threshold.

Through such a dynamic adjustment of the duty cycle, the duty cycle is repeatedly increased and decreased, so that the motor 43 generates the effect of repeated startup impacts, so that the lubricating oil gradually melts, and the starting torque is reduced. When the duty cycle of the PWM signal is at the same duty cycle twice before and after, the rotational speed of the latter one is greater than that of the earlier one. In this way, the rotational speed of the motor 43 changes repeatedly, wherein each repeated change of the rotational speed of the motor 43 includes a rise and a drop and then another rise of the rotational speed. In this way, the motor gradually rises to the final rotational speed (FIG. 33) and ensures that the rotational speed of the motor 43 is not too low to stall, which leads to startup failure.

In the present application, the addition of a signal switch coupled to the trigger mechanism in the power tool avoids switch control failure when the power tool carries a large current and improves the accuracy of switch control in the power tool.

What is claimed is:

1. A power tool comprising:
   a tool accessory;
   a motor configured to drive the tool accessory;
   a control module configured to control the motor;
   a power supply module configured to provide electric power for the motor and the control module; and
   an operating switch, comprising:
   a trigger mechanism actuatable by a user;
   a current switch for turning on or off an electrical connection between the power supply module and the motor; the current switch being coupled to the trigger mechanism to be actuated by the trigger mechanism; and
   a signal switch at least configured to output a control signal to the control module to control a start of the motor; the signal switch being arranged to connect with the trigger mechanism to be actuated by the trigger mechanism,
   wherein the signal switch comprises a first signal switch operably coupled to the trigger mechanism to be actuated by the trigger mechanism when the trigger mechanism is actuated and a second signal switch operably coupled to the trigger mechanism to be actuated by the trigger mechanism when the trigger mechanism is actuated, when the trigger mechanism is actuated from an initial position to an end position, the trigger mechanism sequentially reaches a first position, a second position, and a third position, when the trigger mechanism is actuated to reach the first position, the first signal switch is actuated, when the trigger mechanism is actuated to reach the second position, the current switch is actuated to electrically connect the motor and the power supply module, and, when the trigger mechanism is actuated to reach the third position, the second signal switch is actuated to output a signal to the control module to start the motor, and
   wherein, when the trigger mechanism is released from the end position to the initial position, an on-off state of the second signal switch, an on-off state of the first signal switch, and an on-off state of the current switch, change sequentially, the on-off state of the first signal switch is changed to output a signal to the control module to brake the motor, and the on-off state of the current switch is changed to disconnect the electrical connection between the motor and the power supply module.

2. The power tool of claim 1, wherein the current switch and the signal switch are actuated by the trigger mechanism in a different order.

3. The power tool of claim 1, wherein when the trigger mechanism is actuated to reach a first position, the current switch is actuated to enable the electrical connection between the power supply module and the power tool, when the trigger mechanism is actuated to reach a second position, the signal switch is actuated to output a signal to the control module to control the motor to start, and, when the trigger mechanism is actuated from an initial position to an end position, the trigger mechanism sequentially reaches the first position and the second position.

4. The power tool of claim 1, wherein, when the trigger mechanism is actuated to reach the first position, the first signal switch is actuated to electrically connect the power supply module and the control module.

5. The power tool of claim 1, further comprising a signal switch detection circuit configured to detect the state of the signal switch, the signal switch detection circuit being electrically connected to the signal switch and the control module.

6. The power tool of claim 1, wherein the current switch has at least two pairs of contacts and each pair of the contacts is connected by a metal conductor.

7. The power tool of claim 1, further comprising a housing, which is formed with a handle, wherein a plane that bisects the handle is defined as a handle central plane and the first signal switch and the second signal switch are distributed on both sides of the handle central plane.

8. The power tool of claim 7, wherein a projection of the first signal switch on the handle central plane and a projection of the second signal switch on handle central plane at least partially overlap.

9. The power tool of claim 1, further comprising a power storage element, a drive circuit electrically connected to the motor and the power supply module, and a first switch circuit, connected in series with the power storage element and then connected in parallel with the drive circuit, wherein the control module is electrically connected with the drive circuit and the first switch circuit and the control module is configured to delay turning on the first switch circuit for a predetermined time period after the current switch is turned on.

10. The power tool of claim 9, wherein the predetermined time period ranges from 50 milliseconds to 200 milliseconds.

11. The power tool of claim 9, wherein the first switch circuit comprises a first switch element connected in series with the power storage element and electrically connected with the control module.

12. The power tool of claim 11, wherein the first switch element is a field effect transistor.

13. The power tool of claim 9, further comprising a second switch circuit connected in parallel with the first switch circuit and electrically connected with the control module, the first switch circuit allows a first current to flow therethrough, the second switch circuit allows a second current to flow therethrough, a current value of the first current is greater than a current value of the second current, and the control module is further configured to, after the current switch is turned on and before the first switch circuit is turned on, turn on the second switch circuit to allow the power storage element to be charged with the second current.

14. The power tool of claim 13, wherein the second switch circuit comprises a second switch element electrically connected to the control module and a current limiting element connected in series with the second switch element.

15. The power tool of claim 14, wherein the second switch element is a field effect transistor and the current limiting element is a resistor.

* * * * *